US012335763B2

(12) United States Patent
Jeong et al.

(10) Patent No.: US 12,335,763 B2
(45) Date of Patent: Jun. 17, 2025

(54) METHODS FOR CONTROLLING A CONFIGURATION PARAMETER IN A TELECOMMUNICATIONS NETWORK AND RELATED APPARATUS

(71) Applicant: Telefonaktiebolaget LM Ericsson (publ), Stockholm (SE)

(72) Inventors: Jaeseong Jeong, Solna (SE); Filippo Vannella, Stockholm (SE); Rodrigo Correia, Athlone (IE); Vladimir Verbulskii, Athlone (IE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 538 days.

(21) Appl. No.: 17/774,124

(22) PCT Filed: Nov. 9, 2020

(86) PCT No.: PCT/EP2020/081442
§ 371 (c)(1),
(2) Date: May 3, 2022

(87) PCT Pub. No.: WO2021/089863
PCT Pub. Date: May 14, 2021

(65) Prior Publication Data
US 2022/0394531 A1 Dec. 8, 2022

Related U.S. Application Data

(60) Provisional application No. 62/932,870, filed on Nov. 8, 2019, provisional application No. 62/967,096, filed on Jan. 29, 2020.

(51) Int. Cl.
H04W 24/10 (2009.01)
G06N 3/02 (2006.01)
(Continued)

(52) U.S. Cl.
CPC ............. *H04W 24/10* (2013.01); *G06N 3/02* (2013.01); *H01Q 1/125* (2013.01); *H04L 41/12* (2013.01); *H04W 24/02* (2013.01)

(58) Field of Classification Search
CPC ..... H04W 24/10; H04W 24/02; H04W 16/28; G06N 3/02; H01Q 1/125; H04L 41/12
See application file for complete search history.

(56) References Cited

U.S. PATENT DOCUMENTS 10,039,016 B1 * 7/2018 Larish ................... H04W 24/02
10,644,377 B2 * 5/2020 Olsson ................ H01Q 17/001
(Continued)

FOREIGN PATENT DOCUMENTS

WO 2019007388 A1 1/2019

OTHER PUBLICATIONS

International Search Report and Written Opinion of the International Searching Authority for PCT International Application No. PCT/EP2020/081442 dated Feb. 11, 2021.
(Continued)

*Primary Examiner* — Mounir Moutaouakil
(74) *Attorney, Agent, or Firm* — Sage Patent Group

(57) ABSTRACT

A method performed by a computer system for a telecommunications network. The computer system can access a network metrics repository to retrieve a baseline dataset collected from a baseline policy deployed in the telecommunications network for controlling a configurable parameter of the telecommunications network. The configurable parameter includes an antenna tilt degree. The baseline dataset includes key performance indicators (KPIs) that include KPIs having a continuous value and a plurality of historical changes made to the configurable parameter. The computer system can train a policy model while offline the telecommunications network using the baseline dataset and
(Continued)

inverse propensity scoring on the input KPIs having continuous values to output from the policy model a probability of actions for controlling the configurable parameter. A method performed by network node or network nodes is also provided for using a trained policy model to control the configuration parameter.

17 Claims, 16 Drawing Sheets

(51) Int. Cl.
*H01Q 1/12* (2006.01)
*H04L 41/12* (2022.01)
*H04W 24/02* (2009.01)

(56) References Cited

U.S. PATENT DOCUMENTS

| | | | |
|---|---|---|---|
| 2013/0237158 A1* | 9/2013 | Moe | H04B 17/12 455/67.11 |
| 2013/0252629 A1* | 9/2013 | Wigren | H04W 64/00 455/456.1 |
| 2019/0014487 A1* | 1/2019 | Yang | G06N 3/084 |
| 2019/0014488 A1* | 1/2019 | Tan | G06N 3/044 |
| 2020/0022006 A1* | 1/2020 | Froehlich | H04W 24/08 |
| 2020/0154285 A1* | 5/2020 | Sturgeon | H04W 16/28 |

OTHER PUBLICATIONS

Fan et al., "Self-optimization of coverage and capacity based on a fuzzy neural network with cooperative reinforcement earning," EURASIP Journal on Wireless Communications and Networking, 2014:57, pp. 1-14.

Dudik et al., "Doubly Robust Policy Evaluation and Learning," ICML'11: Proceedings of the 28th International Conference on International Conference on Machine Learning, Jun. 2011, pp. 1097-1104.

Buenestado et al., "Self-tuning of Remote Electrical Tilts Based on Call Traces for Coverage and Capacity Optimization in LTE," IEEE Transactions on Vehicular Technology, vol. 66, No. 5, May 2017, pp. 4315-4326.

Dandanov et al., "Dynamic Self-Optimization of the Antenna Tilt for Best Trade-off Between Coverage and Capacity in Mobile Networks," Wireless Personal Communications vol. 92, 2017, pp. 251-278.

Dhahri et al., "Antenna Parameters Optimization in Self-Organizing Networks: Multi-armed Bandits with Pareto Search," 2017 IEEE 86th Vehicular Technology Conference (VTC-Fall), pp. 1-5.

Guo et al., "Spectral- and Energy-Efficient Antenna Tilting in a HetNet using Reinforcement Learning," 2013 IEEE Wireless Communications and Networking Conference (WCNC), pp. 767-772.

Muhammad Naseer ul Islam et al., "Reinforcement Learning Strategies for Self-Organized Coverage and Capacity Optimization," 2012 IEEE Wireless Communications and Networking Conference (WCNC), pp. 2818-2823.

Mutua et al., "Radio Resource Control for 3G Cellular Networks Based On Fuzzy Logic Control," IOSR Journal of Electronics and Communication Engineering (IOSR-JECE), vol. 13, Issue 1, Ver. II (Jan.-Feb. 2018), pp. 39-50.

Swaminathan et al., "Counterfactual Risk Minimization: Learning from Logged Bandit Feedback," Proceedings of the 32nd International Conference on Machine Learning, Lille, France, 2015. JMLR: W&CP vol. 37, pp. 1-10.

Beygelzimer et al., "The Offset Tree for Learning with Partial Labels," Submitted on Dec. 21, 2008 (v1), last revised Apr. 3, 2016 (this version, v3), arXiv:0812.4044, pp. 1-16.

Dua, D. and Graff, C., "UCI Machine Learning Repository," 2019 [http://archive.ics.uci.edu/ml]. Irvine, CA: University of California, School of Information and Computer Science, 1 page.

* cited by examiner

METHODS FOR CONTROLLING A CONFIGURATION PARAMETER IN A TELECOMMUNICATIONS NETWORK AND RELATED APPARATUS

CROSS REFERENCE TO RELATED APPLICATIONS

This application is a 35 U.S.C. § 371 national stage application of PCT International Application No. PCT/EP2020/081442 filed on Nov. 9, 2020, which claims the benefit of U.S. Provisional Patent Application Ser. No. 62/932,870, filed on Nov. 8, 2019, and U.S. Provisional Patent Application Ser. No. 62/967,096, filed on Jan. 29, 2020, the disclosures and content of which are incorporated by reference herein in their entireties.

TECHNICAL FIELD

The present disclosure relates generally to methods and apparatus for controlling a configuration parameter in a telecommunications network.

BACKGROUND

Configurable parameter control in 4G and 5G cellular networks includes controlling a configurable parameter to optimize or improve Key Performance Indicators (KPIs) of the network. For example, Remote Electrical Tilt (RET) antenna angle control in 4G and 5G cellular networks includes remotely tuning the tilt angle of antennas distributed in the network cells to optimize or improve KPIs of the network.

Antenna tilt refers to the elevation angle of a main lobe of the antenna radiation pattern relative to a horizontal plane. FIG. 1 illustrates an antenna 110 having a main lobe 120. If main lobe 120 is steered downwards with respect to its previous position, main lobe 120 is said to be down-tilted; and if main lobe 120 moves upwards, main lobe 120 is said to be up-tilted, as illustrated in FIG. 1.

SUMMARY

According to some embodiments, a method performed by a computer system for a telecommunications network is provided. The computer system can perform operations accessing a network metrics repository to retrieve a baseline dataset from a baseline policy of a deployed solution in the telecommunications network for controlling a configurable parameter of the telecommunications network. The baseline dataset includes a plurality of key performance indicators, KPIs, that each have a continuous value, and a plurality of historical changes made to the configurable parameter. The computer system can perform training of a policy model (e.g., 520, 690) while offline the telecommunications network using the baseline dataset and Inverse Propensity Score on the plurality of KPIs as inputs to output from the policy model a probability of actions for controlling the configurable parameter.

According to some embodiments, a method performed by a network node of a telecommunications network is provided. The network node can perform operations receiving a trained policy model from a computer system communicatively connected to the network node. The trained policy model is a neural network trained with a baseline dataset collected from a baseline policy deployed in the telecommunications network for controlling a configurable parameter of the telecommunications network. The baseline dataset includes a plurality of key performance indicators, KPIs, that each have a continuous value and a plurality of historical changes made to the configurable parameter. The network node can perform further operations using the trained policy model for controlling a configuration parameter of the telecommunications network. Using the trained policy model includes providing to input nodes of the neural network a plurality of KPIs from at least one cell of the live telecommunications network. Using the trained policy model further includes adapting weights that are used by at least the input nodes of the neural network with a weight vector responsive to a reward of loss value of the output of the probability of actions of at least one output layer of the neural network. Using the trained policy model further includes controlling operation of the configurable parameter of the telecommunications network based on further output of the at least one output layer of the neural network. The at least one output layer provides the further output responsive to processing through the input nodes of the neural network a stream of KPIs from the plurality of KPIs from at least one cell of the live telecommunications network.

According to some embodiments, a computer system for a telecommunications network is provided. The computer system can include a network metrics repository that stores a baseline dataset from a baseline policy deployed in the telecommunications network for controlling a configurable parameter of the telecommunications network. The baseline dataset includes a plurality of key performance indicators, KPIs, that each have a continuous value and a plurality of historical changes made to the configurable parameter. The computer system can include a neural network having an input layer having input nodes, a sequence of hidden layers each having a plurality of combining nodes, and at least one output layer having an output node. The computer device includes at least one processor. The at least one processor can be coupled to the network metrics repository and to the neural network. The at least one processor configured to train a policy model offline the telecommunications network to obtain a trained policy model using the baseline dataset and inverse propensity scoring on the plurality of KPIs as inputs to output from the policy model a probability of actions for controlling the configurable parameter.

According to some embodiments, a network node of a telecommunications network is provided. The network node can include at least one processor. The network node also can include a memory. The memory can contain instructions executable by the at least one processor. The network node is operative to receive a trained policy model from a computer system communicatively connected to the network node. The trained policy model is a neural network trained with a baseline dataset from a baseline policy deployed in the telecommunications network for controlling a configurable parameter of the telecommunications network. The baseline dataset comprises a plurality of key performance indicators, KPIs, that each have a continuous value and a plurality of historical changes made to the configurable parameter. The network node is operative to use the trained policy model for controlling a configuration parameter of the telecommunications network.

In some embodiments, the use includes to provide to input nodes of the neural network a plurality of KPIs from at least one cell of the live telecommunications network. The use further includes to adapt weights that are used by at least the input nodes of the neural network with a weight vector responsive to a reward of loss value of the output of the probability of actions of at least one output layer of the neural network. The use further includes to control operation of the configurable parameter of the telecommunications network based on further output of the at least one output layer of the neural network. The at least one output layer provides the further output responsive to processing through the input nodes of the neural network a stream of KPIs from the plurality of KPIs from at least one cell of the live telecommunications network.

According to some embodiments, a computer system for a telecommunications system is provided. The computer system includes at least one processor configured to determine, from a deployed trained policy model, a value for an action from a plurality of actions for controlling an antenna tilt degree of the antenna of a network node based on a key performance indicator KPI, input to the trained policy model; and signal the value to the network node to control the antenna elevation degree of the antenna of the network node According to some embodiments, a computer program can be provided that includes instructions which, when executed on at least one processor, cause the at least one processor to carry out methods performed by the computer system.

According to some embodiments, a computer program product can be provided that includes a non-transitory computer readable medium storing instructions that, when executed on at least one processor, cause the at least one processor to carry out methods performed by the network node.

Other systems, computer program products, and methods according to embodiments will be or become apparent to one with skill in the art upon review of the following drawings and detailed description. It is intended that all such additional systems, computer program products, and methods be included within this description and protected by the accompanying embodiments.

The following explanation of potential problems is a present realization as part of the present disclosure and is not to be construed as previously known by others. Some approaches for configurable parameter optimization or improvement, e.g. RET optimization or improvement, are built on rule-based policies, heuristically designed through domain knowledge. One approach includes RET self-tuning based on fuzzy logic. Procedures for RET optimization or improvement, however, are becoming increasingly more complex and time consuming due to the growing sophistication of cellular networks. Thus, rule-based optimization strategies can result in a sub-optimal performance, and new approaches to RET optimization or improvement are needed that may increase network performance and reduce operational cost.

Moreover, reinforcement learning (RL) with configurable parameter optimization or improvement (e.g., RET optimization or improvement) is not applicable as a deployment, because exploratory random actions are needed for RL training which is not allowed in customers' networks.

Another possible approach may use an inverse propensity scoring (IPS) technique to use propensity to correct for distribution unbalance between a baseline policy $\pi_0$ and a target policy $\pi$. If input KPI features are continuous values, however, a solution using IPS is difficult to be applied because the propensity score for the continuous valued KPIs cannot be computed.

Thus, improved processes for training and deploying a policy model for controlling a configurable parameter in a telecommunications network are needed.

One or more embodiments of the present disclosure may include methods for training a policy model while offline a telecommunications network using a baseline dataset from a baseline policy and IPS on a plurality of input KPIs having continuous values to output from the policy model a probability of actions for controlling a configurable parameter of the telecommunications network. Operations advantages that may be provided by one or more embodiments include offline learning from the baseline dataset that may lead to improved learning and deployment without exploratory random action in customers' networks. Additionally, one or more embodiments may include techniques for continuous value KPIs which enables use of IPS learning in configurable parameter optimization or improvement (e.g., RET optimization or improvement).

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
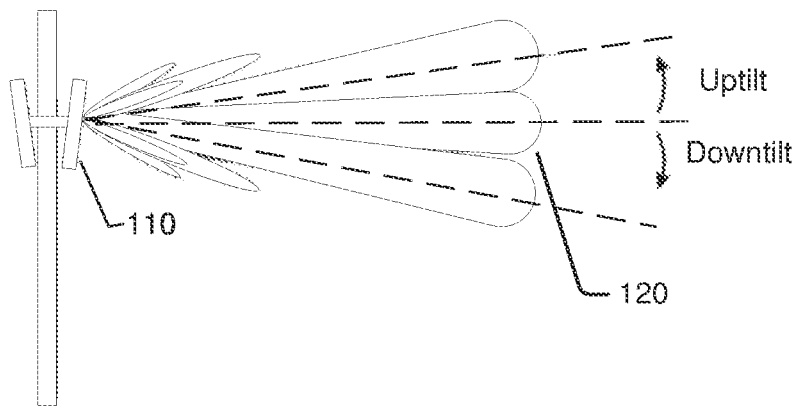
FIG. 1 illustrates up-tilting and down-tilting of an antenna radiation pattern.

Various embodiments will be described more fully hereinafter with reference to the accompanying drawings. Other embodiments may take many different forms and should not be construed as limited to the embodiments set forth herein; rather, these embodiments are provided by way of example to convey the scope of the subject matter to those skilled in the art. Like numbers refer to like elements throughout the detailed description.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In the context of a Self Organizing Network (SON), automation technology was introduced by the 3rd generation partnership project (3GPP) with a goal to achieve fully autonomous RET tilt optimization with a focus on Capacity Coverage Optimization (CCO). See e.g., "Self-tuning of remote electrical tilts based on call traces for coverage and capacity optimization in LTE". Buenestado, M. Toril, S. Luna-Ramirez, J. M Ruiz-Aviles and A. Mendo. IEEE Transactions on Vehicular Technology (Volume: 66, Issue: 5, May 2017) ("Buenestado").

Joint optimization or improvement of capacity and coverage KPIs may include a trade-off focused on maximizing network capacity while trying to ensure that the targeted service areas remain covered.

Generally, approaches for RET optimization are built on rule-based policies, heuristically designed through domain knowledge. One approach includes RET self-tuning based on fuzzy logic. See e.g., Buenestado and "Radio Resource Control for 3G Cellular Networks Based On Fuzzy Logic Control". Jane M. Mutua, George N. Nyakoe, Vitalice K. Oduol. IOSR Journal of Electronics and Communication Engineering (IOSR-JECE). Volume 13, Issue 1, Ver. II (January-February 2018).

However, procedures for RET optimization are becoming increasingly more complex and time consuming due to the growing sophistication of cellular networks. Thus, rule-based optimization strategies can result in a sub-optimal performance, and other approaches to RET optimization or improvement may need to be considered to increase network performance and reduce operational cost.

Some other potential approaches to RET optimization or improvement will now be discussed.

One potential approach may be data-driven RET policy learning. For example, data-driven approaches based on Reinforcement Learning (RL) are discussed in, e.g., "Dynamic Self-Optimization of the Antenna Tilt for Best Trade-off Between Coverage and Capacity in Mobile Networks". N. Dandanov, H. Al-Shatri, A. Klein, V. Poulkov. Wireless Personal Communications: An International Journal. Volume 92 Issue 1, January 2017, and W. Guo, S. Wang, Y. Wu, J. Rigelsford, X. Chu, T. O'Farrel. "Spectral and Energy-Efficient Antenna Tilting in a HetNet using Reinforcement Learning". 2013 IEEE Wireless Communications and Networking Conference (WCNC).

Figure 2:
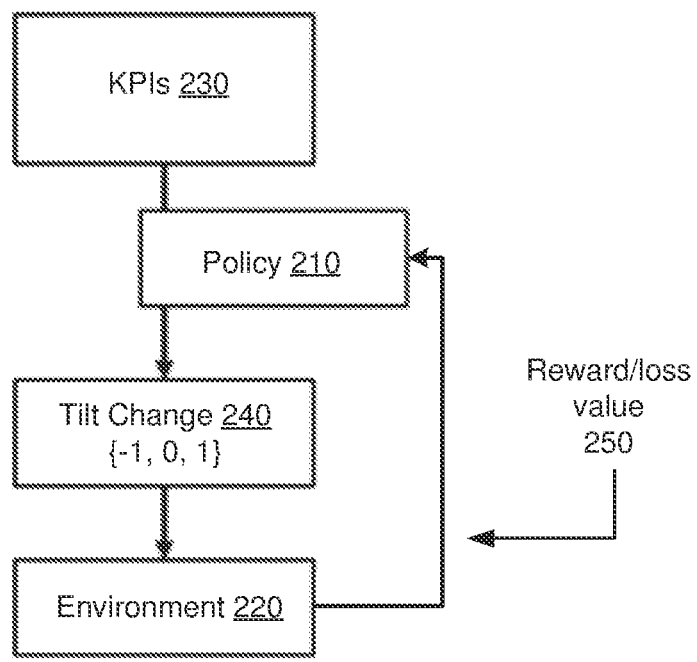
FIG. 2 is a block diagram illustrating policy learning through feedback.

In a data-driven approach based on RL, an agent may learn an optimal behavior (policy) by directly interacting with the environment and collecting a reward/loss signal as a consequence of executing an action in a given state. FIG. 2 is a block diagram illustrating policy RL through feedback (arrow 250). FIG. 1 illustrates a high level feedback loop where the action is a tilt change 240 with a change a tilt degree by −1 degree, 0, or 1 degree. Reinforcement learning may be one approach to improve a policy 210 by using feedback 250 of actions 240 from environment 220.

While operating a telecommunications network, large amounts of data are collected and stored offline by telecommunications operators at little or no cost. These offline datasets represent an opportunity for learning policies in data driven techniques. This opportunity may be particularly helpful in the case of RL approaches where an agent is required to learn in a trial and error fashion that may inevitably degrade the performance of the network during the first exploration phase.

Figure 3:
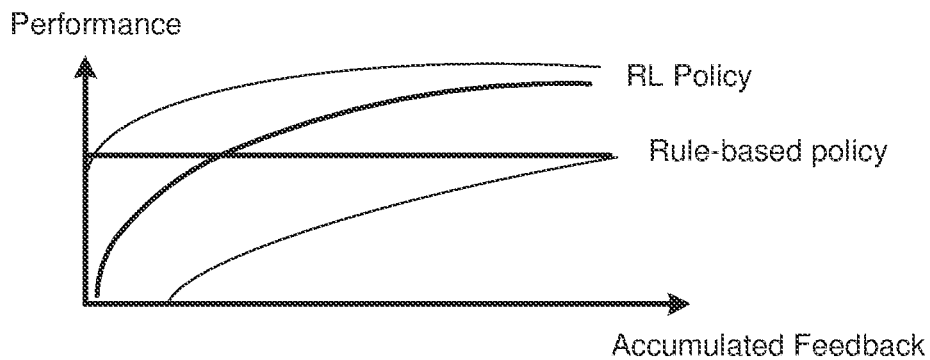
FIG. 3 illustrates a graph of reinforcement learning policy versus rule-based policy performance.
Figure 4:
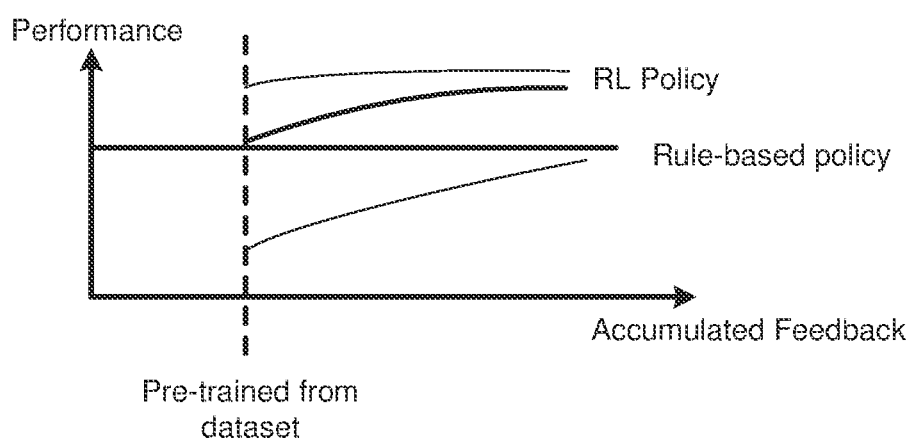
FIG. 4 illustrates a graph of pre-training from a dataset of reinforcement learning policy versus rule-based policy performance.

In another potential approach, learning a new policy from offline data, and not relying on online experiments, can avoid the initial exploration phase by initializing a policy having better performance than the rule-base policy used to collect the offline dataset, as illustrated in the graph of FIG. 3. FIG. 3 illustrates a graph of performance versus accumulated feedback for a reinforcement learning policy and a rule-based policy. FIG. 4 illustrates a graph of performance versus accumulated feedback for a reinforcement policy and a rule-based policy where the reinforcement policy is pre-trained from offline data.

An offline learning problem may be formally framed in the Contextual Bandit (CB) setting where, at each iteration, the agent:

1) Observes a context x∼P($\mathcal{X}$) where $\mathcal{X} \subseteq \mathbb{R}^d$ is the context space. The context is assumed to be drawn independently and identically distributed (i.i.d) from an unknown distribution over the context space P($\mathcal{X}$).

2) Chooses an action y∼π($\mathcal{Y}$|x) where π($\mathcal{Y}$|x): $\mathcal{X} \to$ P($\mathcal{Y}$)∈Π is the policy, being a function from context to distributions over the action space $\mathcal{Y}$ and representing the behavior of the policy, and Π is a class of considered policies.

3) Observes a feedback (loss) δ(x,y): $\mathcal{X} \times \mathcal{Y} \to$ R, representing the loss experienced for executing action y for context x.

A baseline dataset $\mathcal{D}_{\pi_0} = \{(x_i, y_i, \delta_i)\}_{i=1}^N$ collected using a baseline policy $\pi_0$ also exists. In this setting, an objective is to derive a policy π∈Π using samples from the baseline dataset $\mathcal{D}_{\pi_0}$ that minimize the expected risk:

$$R(\pi) = E_{x \sim P(\mathcal{X})} E_{y \sim \pi(\cdot|x)}[\delta(x,y)] = E_\pi[\delta(x,y)]$$

This risk, however, is not directly computable from dataset $\mathcal{D}_{\pi_0}$ due to the distribution mismatch between the learning policy $\pi$ and the baseline policy $\pi_0$. This problem can be addressed by using an estimator of the expected risk based on the Inverse Propensity Score (IPS) technique:

$$R(\pi) = E_\pi[\delta(x, y)] = \int_{x \in X} \int_{y \in Y} \delta(x, y) p(x) \pi(y|x) dx dy =$$

$$\int_{x \in X} \int_{y \in Y} \delta(x, y) p(x) \pi_0(y|x) \frac{\pi(y|x)}{\pi_0(y|x)} dx dy = E_{\pi_0}\left[\delta(x, y) \frac{\pi(y|x)}{\pi_0(y|x)}\right]$$

A core idea of the IPS technique is to use propensity to correct for distribution unbalance between baseline policy $\pi_0$ and target policy $\pi$. The estimator that results from it is the Monte-Carlo IPS estimator of true risk:

$$\hat{R}(\pi) = \frac{1}{N} \sum_{i=1}^{N} \delta_i \frac{\pi(y_i|x_i)}{\pi_0(y_i|x_i)}$$

This estimator is a provably unbiased estimator of the true expected risk ($E[\hat{R}(\pi)]=R(\pi)$) and it forms the basis of a new learning objective:

$$\pi = \underset{\pi \in \Pi}{\operatorname{argmin}}\{\hat{R}(\pi)\} = \underset{\pi \in \Pi}{\operatorname{argmin}} \frac{1}{N} \sum_{i=1}^{N} \delta_i \frac{\pi(y_i|x_i)}{\pi_0(y_i|x_i)}$$

A potential approach to solve this minimization problem may be to parametrize the policy $\pi$ with a parameter vector w (e.g using a linear model or an Artificial Neural Network (ANN)) and running a gradient-descent based optimization method on the objective with the parametrized policy $\pi_w$.

Potential problems with rule-based solutions for controlling a configurable parameter in a telecommunication network may include that a rule-based solution (e.g., for RET optimization or improvement) requires field engineers to tune parameters; and performance feedback from a telecommunication network is not used for improving the solution.

Potential problems with RL solutions for controlling a configurable parameter in a telecommunications network, e.g. for controlling RET optimization or improvement, may include: A RL framework with RET optimization or improvement is not applicable for deployment, because exploratory random actions are needed for RL training which are not allowed in customers' networks.

Potential problems with IPS learning algorithm for use in a solution for controlling a configurable parameter in a telecommunications network, e.g. for controlling RET optimization or improvement, may include: If input KPI features are continuous values, the solution may be hard to apply because the propensity score for the continuous valued KPIs cannot be computed.

In various embodiments of the present disclosure, a policy for a network configuration can be trained by a historical log or other records of network configuration changes made by different solutions. One exemplary application is RET optimization or improvement in a 4G/5G SON, where the action of a policy is tilt angle increase/decrease/no change, and a SON RET optimization product solution generates and keeps tilt angle change logs or other records. In a RET scenario in accordance with various embodiments, the policy takes the same input/output structure of the deployed SON RET solution, but the policy model inside is capable of learning from the dataset which includes {(state, action, reward)} trajectories generated by the deployed SON RET solution.

In various embodiments of the present disclosure, a training pipeline of a policy model with a static baseline dataset, may include 1) dataset preprocessing, and 2) neural network training with an IPS learning objective. In various embodiments, the training pipeline addresses action imbalance in the log dataset by employing Inverse Propensity Scoring (IPS) on continuous-valued KPIs.

Presently disclosed embodiments may provide potential advantages. One potential advantage may provide for offline learning from a deployed SON solution dataset, without the need for exploratory random action in customers' networks. Rather, in various embodiments, a new policy model is derived offline from the deployed SON solution datasets, where the datasets include the log or other record of configuration changes made by the deployed SON RET solution.

Additional potential advantages of various embodiments of presently disclosed embodiments includes a binning technique of continuous value KPIs to enable application of IPS learning (see e.g., A. Swaminathan, T. Joachims. "Counterfactual Risk Minimization: Learning from Logged Bandit Feedback". Proceedings of the 32nd International Conference on Machine Learning, Lille, France, 2015) in RET optimization or improvement.

Further potential advantages of various embodiments of presently disclosed embodiments may include ease of transfer to online learning. Once the pre-trained policy model is derived offline, the trained policy may be deployed to the actual network. If the offline and online policy models are the same (model consistency), the weights of, e.g., a neural network trained in accordance with various embodiments of the present disclosure can be used to initialize the online policy for online learning.

Various embodiments include two parts: 1) a policy model with a specified input/output structure, and 2) a training pipeline for the policy model with a baseline dataset from a deployed baseline policy.

Figure 5:
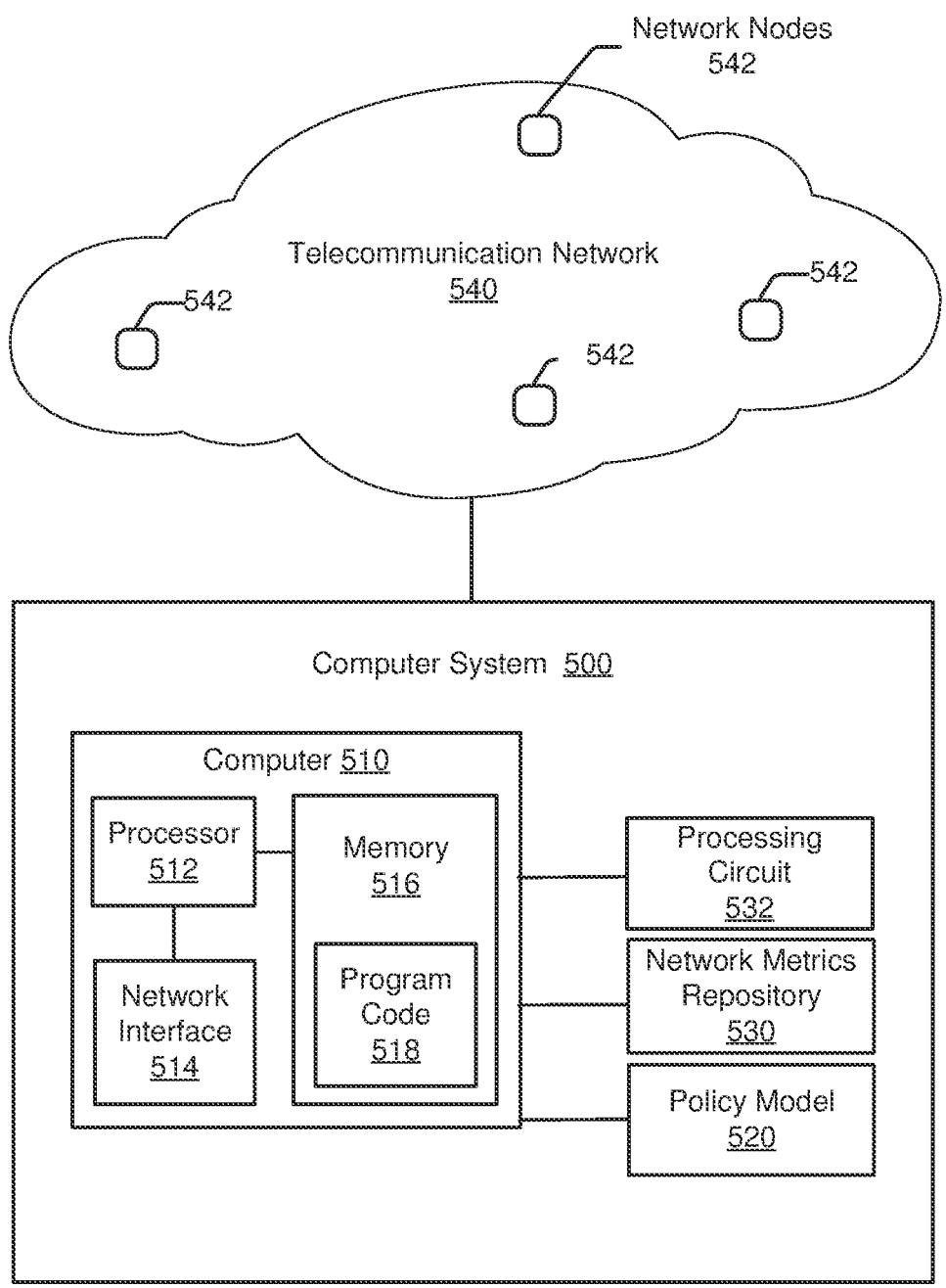
FIG. 5 illustrates a telecommunications network communicatively connected to a computer system according to some embodiments of the present disclosure.

FIG. 5 illustrates a computer system 500 that trains a policy model 520 and deploys the trained policy model to one or more network nodes 542 in telecommunications network 540. The computer system 500 includes the policy model 520, a network metrics repository 530, a processing circuit 532, and a computer 510. The computer 510 includes at least one memory 516 ("memory") storing program code 518, a network interface 514, and at least one processor 512 ("processor") that executes the program code 518 to perform operations described herein. The computer 510 is coupled to the network metrics repository 530, the policy model 520, and the processing circuit 532. The computer system 500 can be communicatively connected to a telecommunications network 540 that includes a plurality of network nodes 542 that receive and forward communication packets being communicated through the network that include KPIs for cells in telecommunications network 540. More particularly, the processor 512 can be connected via the network interface 514 to communicate with the network nodes 542 and the network metrics repository 530.

The processor 512 may include one or more data processing circuits, such as a general purpose and/or special purpose processor (e.g., microprocessor and/or digital signal processor) that may be collocated or distributed across one or more networks. The processor 512 may include one or more instruction processor cores. The processor 512 is configured to execute computer program code 518 in the memory 516, described below as a non-transitory computer readable medium, to perform at least some of the operations described herein as being performed by any one or more elements of the computer system 500.

Computer system 500 may be a cloud-based machine learning execution environment computer system or a cloud-based computing system communicatively coupled to the telecommunications network.

Figure 6:
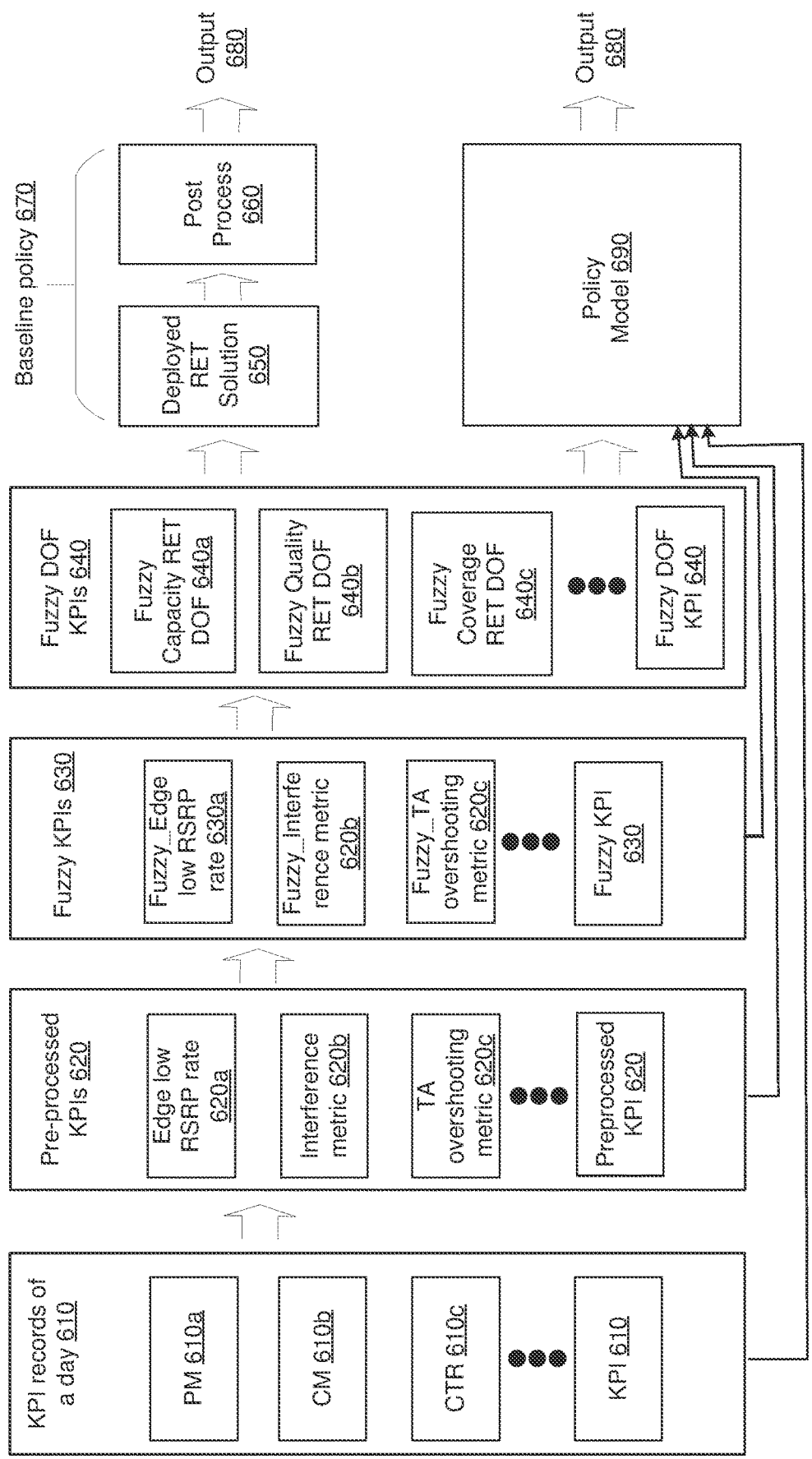
FIG. 6 is a block diagram illustrating inputs and output of a baseline policy, and a policy model according to some embodiments of the present disclosure.

Policy model structure will now be discussed. FIG. 6 is a block diagram illustrating inputs and output of a deployed baseline policy, and a policy model according to some embodiments of the present disclosure. As illustrated in FIG. 6, a deployed baseline policy 670 includes a deployed RET solution 650. The illustrated deployed RET solution takes Degree of Fire (DOF) KPIs 640 of a cell as input. A DOF indicates a degree of alarm in a KPI of a cell, such as in capacity, quality and/or coverage. Fuzzy DOF KPIs 640 are computed by preprocessing performed of KPI records of a day 610. Fuzzy logic may convert input values into fuzzy data sets. For example, KPIs may be input into a fuzzy logic circuit and fuzzified to convert each value into a range of values mapped to a characteristic of the KPI.

While a time period of a day is referenced in the example embodiment of FIG. 6, the various embodiments are not so limited and any time period may be used. The preprocessing of KPI records 610 also may include preprocessing 620 of performance measurements (PM) 610a, configuration measurements (CM) 610b, cell traffic records (CTR) 610c data, etc. within a cell and their fuzzification 630. Preprocessing 620 includes, for example, cell edge low reference signal received power (RSRP) rate 620a, interference metric 620b, timing advance (TA) overshooting metric 620c, etc. Fuzzification 630 includes, for example, fuzzy capacity RET DOF 640a, fuzzy quality RET DOF 640b, fuzzy coverage RET DOF 640c, etc. The input to policy model 690 may be KPI records 610, pre-processed KPIs 620, fuzzy KPIs 630, or fuzzy DOF KPIs 640.

As used in the present disclosure the term KPI refers to raw KPIs (e.g., KPI records 610), pre-processed KPIs 620, fuzzy KPIs 630, and/or fuzzy DOF KPIs 640. While the example embodiment of FIG. 6 describes policy model structure for training policy model 690 for controlling a RET of an antenna, the various embodiments of the present disclosure are not so limited and include training policy model 690 for controlling a configurable parameter in a telecommunications network. Accordingly, the exemplary KPIs referenced in FIG. 6 for training policy model 690 for controlling a RET of an antenna also are not so limited and include KPIs relating to any configurable parameter in a telecommunications network.

Still referring to FIG. 6, output 680 of baseline policy 670 and policy model 690 is a probability of actions on the configurable parameter, e.g., tilt adjustment for an antenna.

As described below with reference to FIGS. 11 and 12, in some embodiments, policy model 690 may be a multiple layer neural network whose input and output is the same input and output of a deployed RET solution. For example, as shown in FIG. 6, inputs may be KPIs of capacity, quality and coverage (e.g., Fuzzy CAPACITY RET DOF 640a, Fuzzy QUALITY RET DOF 640b, Fuzzy COVERAGE RET DOF 640c) of a cell within a day, and output 690 is a probability of actions (e.g., {tilt increase, no change, tilt decrease}).

In the example embodiment of FIG. 6, the time scale for both the deployed RET solution and RL policy model 690 is a daily basis. For each day, KPIs of the day are fed into policy model 690 as inputs. After that, action 690 given by policy model 690 is applied to the antenna tilt setup for the next day.

In various embodiments, policy model 690 is a global policy model. The term "global policy model" refers to one policy model 690 is trained by the data samples collected from all cells in the network. Then the global policy model 690 is applied to every cell to control the tilt of an antenna(s) (or to control another configurable parameter).

Figure 7:
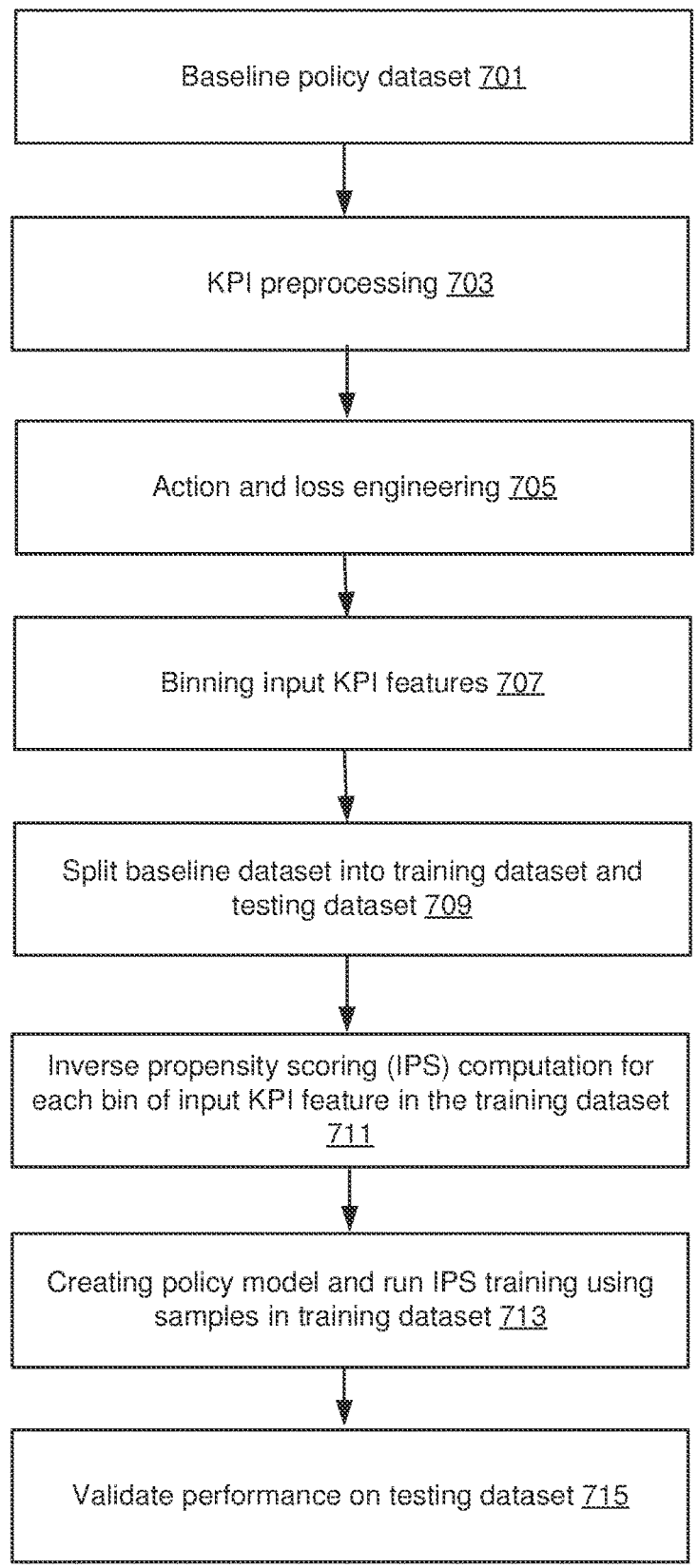
FIG. 7 is a flowchart illustrating training operations that may be performed by a computer system in accordance with some embodiments of the present disclosure.

A training pipeline for policy model 690 will now be discussed. Given the structure of policy model 690, in various embodiments, a training pipeline including an algorithm for the policy model learning is provided. FIG. 7 is a flowchart illustrating training operations that may be performed by a computer system (described below) during a training pipeline for training policy model 690.

Referring to FIG. 7, KPI preprocessing 703 of raw KPIs in the dataset (baseline dataset 701) provides indications of, e.g., coverage, capacity and quality for each cell within a day. Baseline policy dataset 701 and KPI preprocessing 703 may be provided from a deployed solution (e.g., a deployed SON RET optimization solution).

At block 705, action and loss engineering are performed. In other words, action on the configurable parameter (e.g., tilt adjustment for each day and each cell in the dataset) are extracted, and the corresponding loss value (or reward value) are calculated. The loss vale refers to a variation of a daily performance metric between the current day and the subsequent day, that indicates a consequence of the given action. The performance metric can be designed upon the customer's needs. One example is a function of Fuzzy DOF KPIs 640 (e.g., max(Coverage DOF, Capacity DOF, Quality DOF)).

At block 707, input state features (e.g., in a deployed SON RET case, Fuzzy COVERAGE RET DOF 640a, Fuzzy QUALITY RET DOF 640b, Fuzzy CAPACITY RET DOF 640c) whose values are continuous within [0,1] are binned into discretized features. For example, if four bins are set per each KPI, the total number of bins for three Fuzzy DOF KPIs is 4^3.

Figure 8:
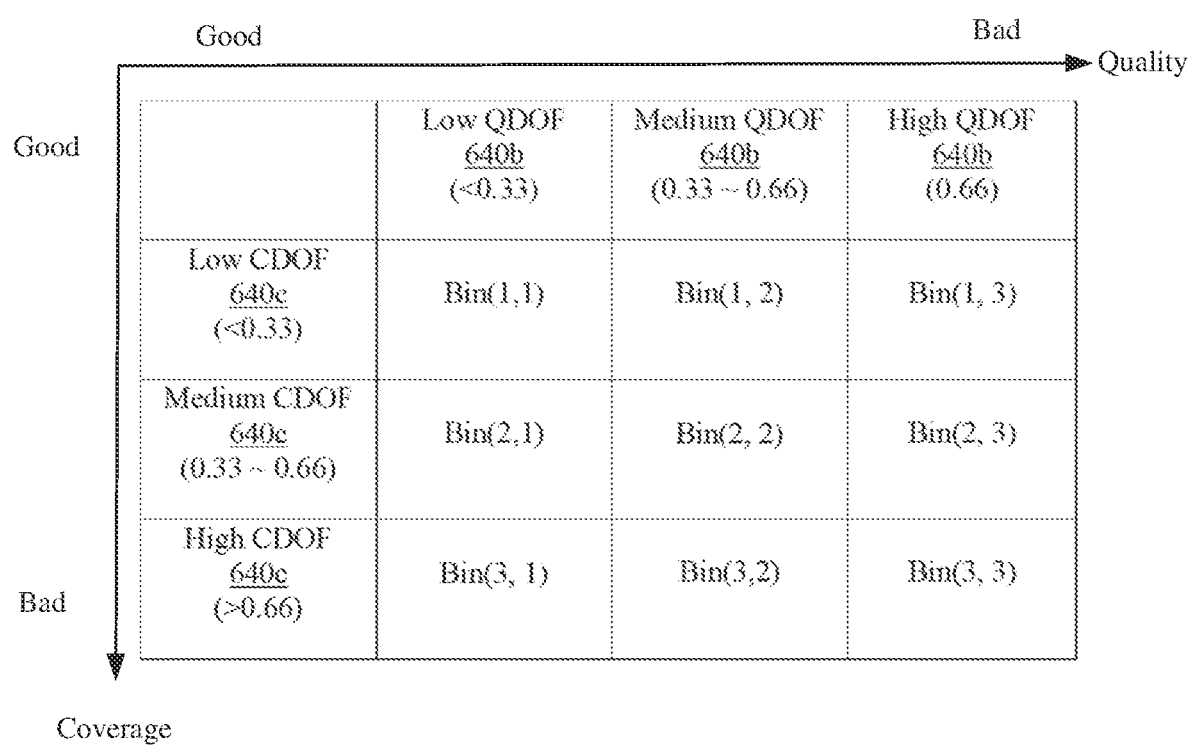
FIG. 8 is a table illustrating binning of continuous value KPIs in accordance with some embodiments of the present disclosure.

FIG. 8 illustrates one example of binning for two KPIs (e.g., CDOF 640c, QDOF 640b) with three bins for each, and thereby, 9 bins in total. Each KPI of FIG. 8 (whose value is ranged between 0 and 1) is binned into three bins (0~0.33, 0.33~0.66, 0.66~1).

Referring again to FIG. 7, at block 709, the baseline dataset is split into a training dataset and a testing dataset.

At block 711, for each bin, the inverse propensity scoring (IPS) for each action 'y' (for each bin of input K{I feature in the training set) is calculated as follows:

(# of action 'a' samples in the bin in the training dataset)/(# of samples in the bin in the training dataset).

At block 713, policy model 690 (e.g., a neural network) is created and trained with an IPS algorithm (see e.g., A. Swaminathan, T. Joachims. "Counterfactual Risk Minimization: Learning from Logged Bandit Feedback". Proceedings of the 32nd International Conference on Machine Learning, Lille, France, 2015), e.g., by using samples in the training dataset and solving the following equation:

$$\pi^* = \underset{\pi \in \Pi}{\operatorname{argmin}} \frac{1}{N} \sum_{i=1}^{N} \delta_i \frac{\pi(y_i|x_i)}{p_i},$$

where i is sample index (e.g., corresponding to a certain cell and day), $\delta_i$ is loss, $\pi(y_i|x_i)$ is the baseline policy for the deployed solution that outputs a probability of action $y_i$ given each continuous value of each of the KPIs as inputs, state $x_i$, and $p_i$ is the inverse propensity score.

At block 715, performance of policy model 690 is validated on the testing dataset.

IPS algorithms will now be discussed further.

In various embodiments of the present disclosure, a baseline dataset $\mathcal{D}_{\pi_0}$ generated according to a rule-based expert policy $\pi_0(y_i|x_i)$ as described above is used for training. Baseline policy 670 may be suboptimal with respect to a given cost objective, and a new policy $\pi_w(y_i|x_i)$ 690 is derived.

Various embodiments include context, action, and loss.

Context includes a set of measurements, e.g., collected in the cell considered for the RET control. In particular, e.g., context may be in the form $x_i=[c_{DOF}, q_{DOF}] \subseteq [0,1]^2$, where $c_{DOF}$ and $q_{DOF}$ are the capacity and coverage Degree Of Fire (DOF) 640, measuring the degree of alarm perceived by policy 690 with respect to the capacity and quality in the cell. Values close to one of these KPIs mean poor capacity and quality in the cell and vice-versa.

Action includes a discrete unitary change, e.g., in the current antenna tilt degree $y_i \in \{-1, 0, 1\}$.

Loss includes a measure of the context variation induced by the action $y_i$ taken given the context, e.g., $x_i$: $\delta_i = \delta(x_i, y_i) = \max\{CDOF_{i+1}, QDOF_{i+1}\} - \max\{CDOF_i, QDOF_i\}$.

In some embodiments, the training policy $\pi_w(y_i|x_i)$ may be a ANN model parametrized by weight vector w and with an output softmax layer, taking as input a 2D context vector $x_i$ and returning a probability distribution for all actions $y_i \in \{-1, 0, 1\}$, resulting in a stochastic policy.

In some embodiments, the baseline dataset $\mathcal{D}_{\pi_0}$ is split into a training dataset (e.g., 70%) and a testing dataset (e.g., 30%). The training dataset is used to learn the ANN policy $\pi_w(y_i|x_i)$ on the IPS learning objective:

$$\pi^* = \underset{w}{\arg\min} \hat{R}(\pi_w) = \underset{w}{\arg\min} \frac{1}{N} \sum_{i=1}^{N} \delta_i \frac{\pi_w(y_i|x_i)}{\pi_0(y_i|x_i)}.$$

Figure 9:
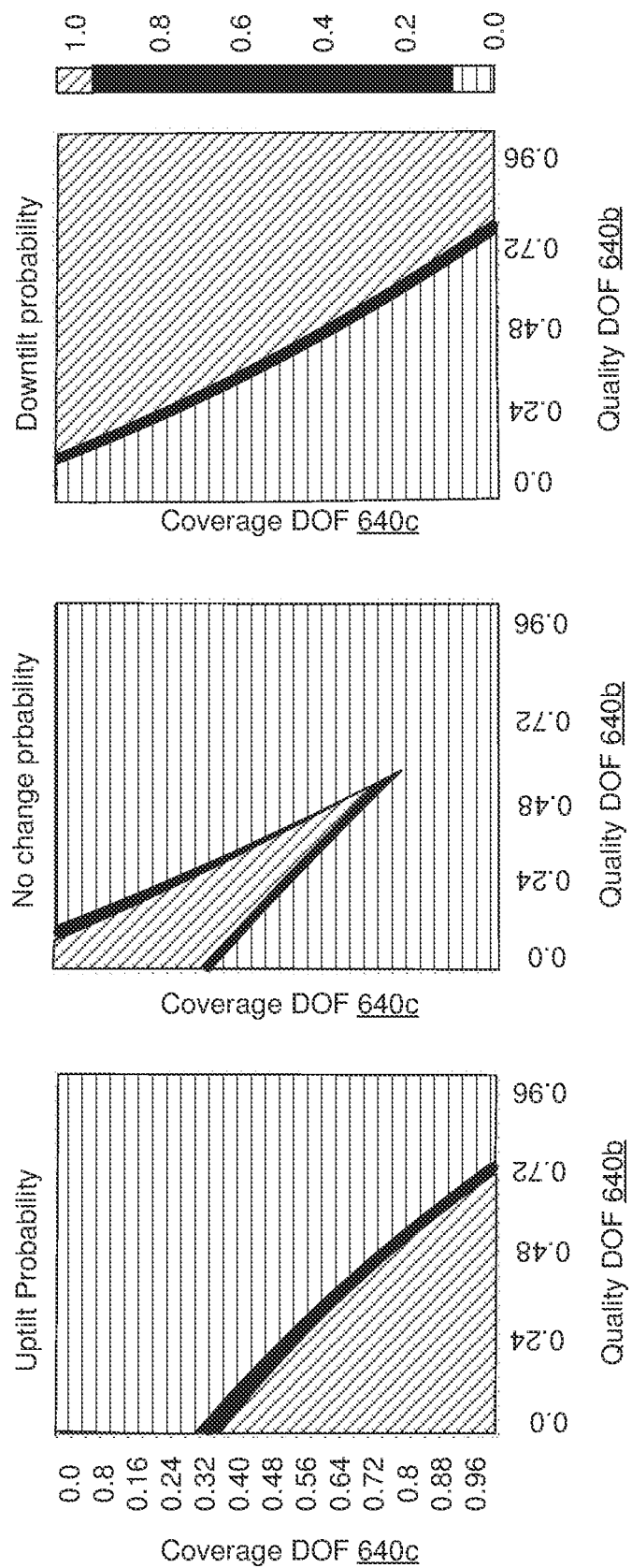
FIG. 9 is an exemplary action probability heatmap of a policy model in accordance with some embodiments of the present disclosure.

FIG. 9 is an exemplary action probability heatmap of a policy model for controlling RET of an antenna in accordance with some embodiments of the present disclosure. The x and y axis of FIG. 9 are quality KPI and coverage KPI, respectively. The heatmap of action probability for up-tilt (left), no change (middle) and down-tilt (right) actions given by a trained policy are shown.

The action probability heatmap of FIG. 9 is from a policy model that is a neural network with 3 layers-10 hidden nodes. The heatmap illustrates that the trained policy model provides reasonable action probability: when coverage DOF is high and quality DOF is low (in other words, coverage of the cell is bad and quality of the cell is good), up-tilt probability is almost 1 whereas down-tilt/no change probability is 0.

The policy model of FIG. 9 was validated on a testing dataset, and provides 20% performance improvement over the deployed SON RET solution.

Figure 10:
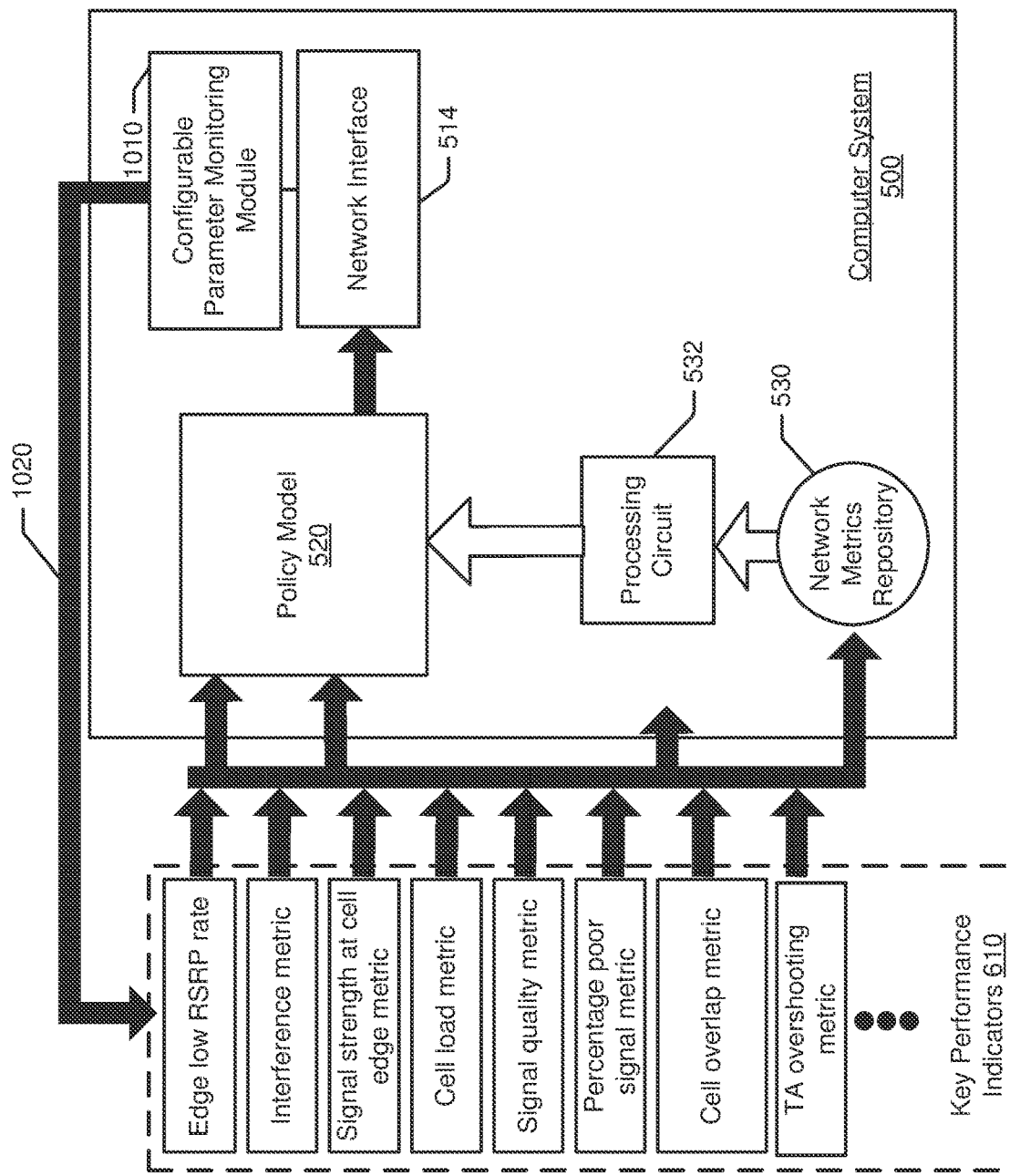
FIG. 10 illustrates an operational view of a computer system that is processing the KPIs of the telecommunications network in accordance with some embodiments of the present disclosure.

FIG. 10 illustrates an operational view of a computer system that is processing the KPIs of the telecommunications network in accordance with some embodiments of the present disclosure.

Referring to FIG. 10, network metrics repository 530 may store a baseline dataset including KPIs 610 that were measured or pre-processed during operation of a telecommunications network 542. The baseline dataset may have been generated by an expert and/or rule based policy. A configurable parameter monitoring module 1010 can operate to monitor performance characteristics of cells in a live communication network (e.g., measure interference that a target cell creates with at least one neighboring cell or receive measurements from the network nodes) to generate various types of KPIs therefrom. The KPIs 610 from a live deployed solution in the telecommunications network can be input to network metrics repository 530. The KPIs 610 that can be generated for each of the cells and input to the computer system 500 for processing, can include, without limitation, edge low RSRP rate(s), interference metric(s), signal strength provided to user equipment at an edge of a cell, load on a cell and load on a neighboring cell, signal quality at a defined distance from the RET antenna, percentage of user equipment at a cell edge that suffer from poor signal strength, overlap between a cell and at least one neighboring cell, TA overshooting, signal strength to user equipment in a cell under evaluation, distance of user equipment from a RET antenna, interference that a cell creates with at least one neighboring cell, etc.

The KPIs 610 can be input to the network metrics repository 530 for storage and may include pre-processed, fuzzy, and DOF KPIs. The network metrics repository 530 may also store reward or loss values which correlate to a KPI difference before and after tilting a RET antenna.

During the training mode, the KPIs are provided to input nodes of the policy model neural network circuit 520. The policy model neural network circuit 220 processes the inputs to the input nodes through neural network hidden layers which combine the inputs, as will be described below, to provide outputs for combining by an output node. The output node provides an output value responsive to processing through the input nodes of the policy model neural network circuit a stream of KPIs that are obtained from the baseline dataset. The value output by the output node of the policy model neural network 520 may function as a probability of actions (e.g., increase tilt angle, decrease tilt angle, or no change in tilt angle). The output node on the policy model neural network circuit 520 also generates a policy reward or loss value that correlates a KPI difference before and after tilting the RET antenna. The policy model neural network circuit 520 may use the policy reward or loss value to further train the policy model neural network circuit 520.

During a training mode, the processing circuit 532 adapts weights that are used by at least the input nodes of the policy model neural network circuit 520 responsive to policy reward or loss value output of the output node of the policy model neural network circuit 520.

The processing circuit 532 also may operate to use the policy reward or loss value to adapt the weights which may be used by nodes of the policy model neural network circuit 520 network hidden layers.

Figure 11:
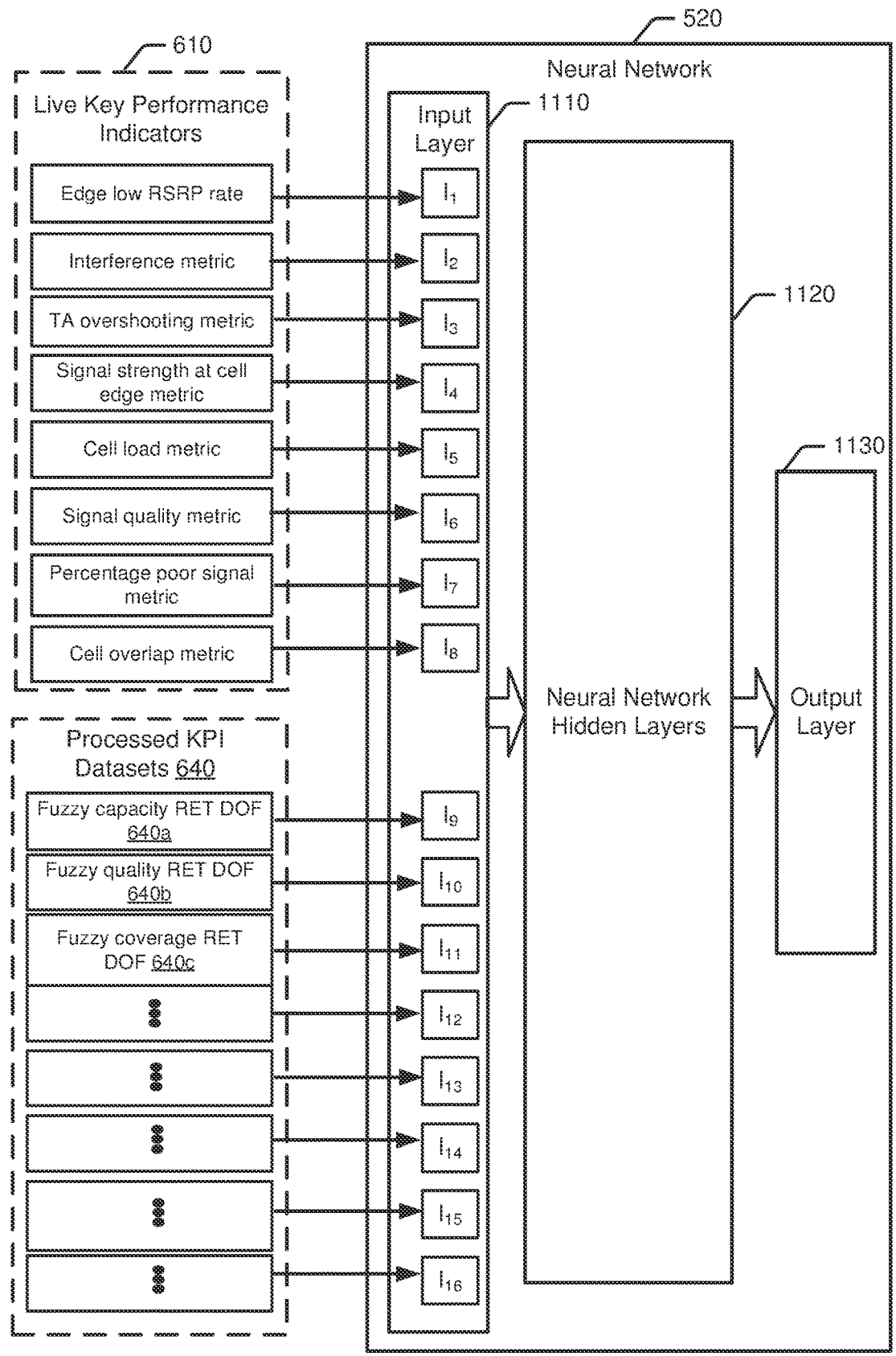
FIG. 11 illustrates elements of the neural network circuit which are interconnected and configured to operate in accordance with some embodiments of the present disclosure.

FIG. 11 illustrates elements of the neural network circuit which are interconnected and configured to operate in accordance with some embodiments of the present disclosure.

In the non-limiting illustrative embodiment of FIG. 11, during a training mode, the policy model neural network circuit 520 operates the input nodes of the input layer 1110 to each receive different KPIs 610. Each of the input nodes multiply a KPI value that are input by a reward or loss value that is feedback to the input node to generate a weighted KPI value. When the KPI value exceeds a firing threshold assigned to the input node, the input node then provides the weighted KKPI value to the combining nodes of the first one of the sequence of the hidden layers 1120. The input node does not output the weighted KPI value if and until the weighted KPI value exceeds the assigned firing threshold Although the embodiment of FIG. 11 shows a one-to-one mapping between each type of KPI 610 and one input node of the input layer 1110, other embodiments are not limited thereto. For example, in one embodiment, a plurality of different types of KPIs can be combined to generate a combined KPI that is input to one input node of the input layer 1110. Alternatively, or additionally, in a second embodiment, a plurality of KPIs over time for a single type of KPI for a cell and/or its neighboring cells can be combined to generate a combined KPI that is input to one input node of the input layer 1110.

In one illustrative embodiment, the processing circuit 532 of computer system 500 combines a plurality of the KPIs 610 in a stream during operation to generate an aggregated KPI. Operation of the tilt angle of the RET antenna, for example, is then based on output of the output node of the output layer 1130 of the policy model neural network circuit 520 while processing through the input nodes "I" of the input layer 1110 of the policy model neural network circuit 520 the aggregated measured performance.

Figure 12:
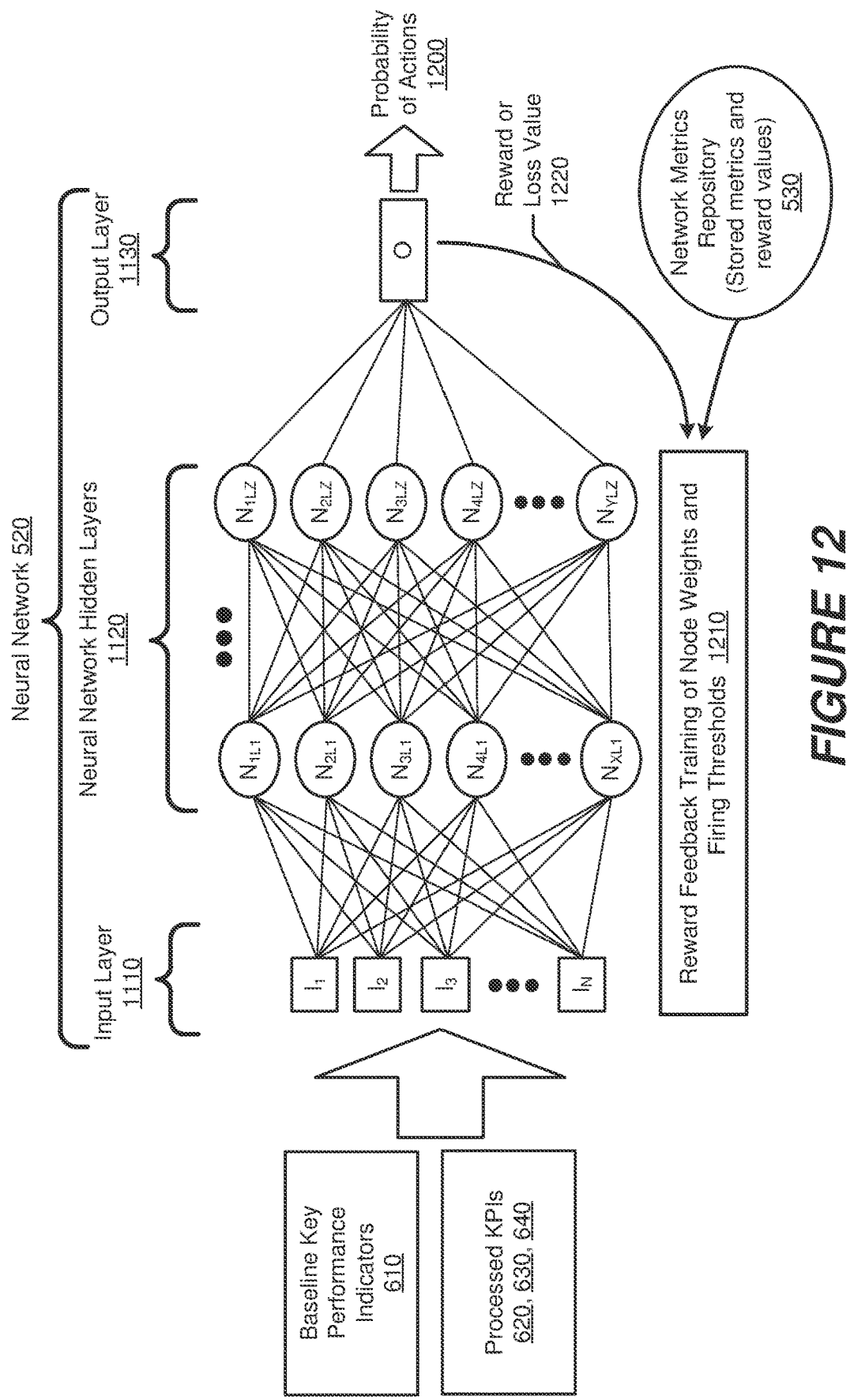
FIG. 12 is a block diagram and data flow diagram of a neural network circuit that can be used in the computer system to generate a probability of actions and a loss value in accordance with some embodiments of the present disclosure.

FIG. 12 is a block diagram and data flow diagram of a policy model neural network circuit 520 that can be used, e.g., in the computer system 500 to generate a probability of actions (e.g., tilt angles) 1200 and perform feedback training of the node weights and firing thresholds 1210 of the input layer 1110, the neural network hidden layers 1120 and at least one output layer 1130.

Referring to FIG. 12, the policy model neural network circuit 520 includes the input layer 1110 having a plurality of input nodes, the sequence of neural network hidden layers 120 each including a plurality of weight nodes, and at least one output layer 1130 including an output node. In the particular non-limiting example of FIG. 12, the input layer 1110 includes input nodes $I_1$ to $I_N$ (where N is any plural integer). The KPIs 610, 620, 630, and/or 640 are provided to different ones of the input nodes $I_1$ to $I_N$. A first one of the sequence of neural network hidden layers 1120 includes weight nodes $N_{1L1}$ (where "1L1" refers to a first weight node on layer one) to $N_{XL1}$ (where X is any plural integer). A last one ("Z") of the sequence of neural network hidden layers 1120 includes weight nodes $N_{1LZ}$ (where Z is any plural integer) to $N_{YLZ}$ (where Y is any plural integer). At least one output layer 1130 includes an output node O.

The policy model neural network circuit 520 of FIG. 12 is an example that has been provided for ease of illustration and explanation of one embodiment. Other embodiments may include any non-zero number of input layers having any non-zero number of input nodes, any non-zero number of neural network layers having a plural number of weight nodes, and any non-zero number of output layers having any non-zero number of output nodes. The number of input nodes can be selected based on the number of KPIs 610, 620, 630, and/or 640 that are to be simultaneously processed, and the number of output nodes can be similarly selected based on the number of probability values 1200 that are to be simultaneously generated therefrom.

The policy model neural network circuit 1200 can be operated to process different KPIs 610, 620, 630 and/or 640, during a training mode by the processing circuit 532 and/or during the run-time mode of the trained policy model 520 by a network node 542 (described below), through different inputs (e.g., input nodes $I_1$ to $I_N$) of the policy model neural network circuit 520. KPIs 610, 620, 630, and/or 640 that can be simultaneously processed through different input nodes $I_1$ to $I_N$ may include at least one of the following:

1) edge low RSRP rate;
2) an interference metric;
3) TA overshooting metric;
4) signal strength provided to user equipment at an edge of a cell;
5) load on a cell and load on a neighboring cell;
6) signal quality at a defined distance from the RET antenna;
7) percentage of user equipment at a cell edge that suffer from poor signal strength;
8) overlap between a cell and at least one neighboring cell;
9) signal strength to user equipment in a cell under evaluation;
10) distance of user equipment from a RET antenna; and
11) interference that a cell creates with at least one neighboring cell.

Figure 13:
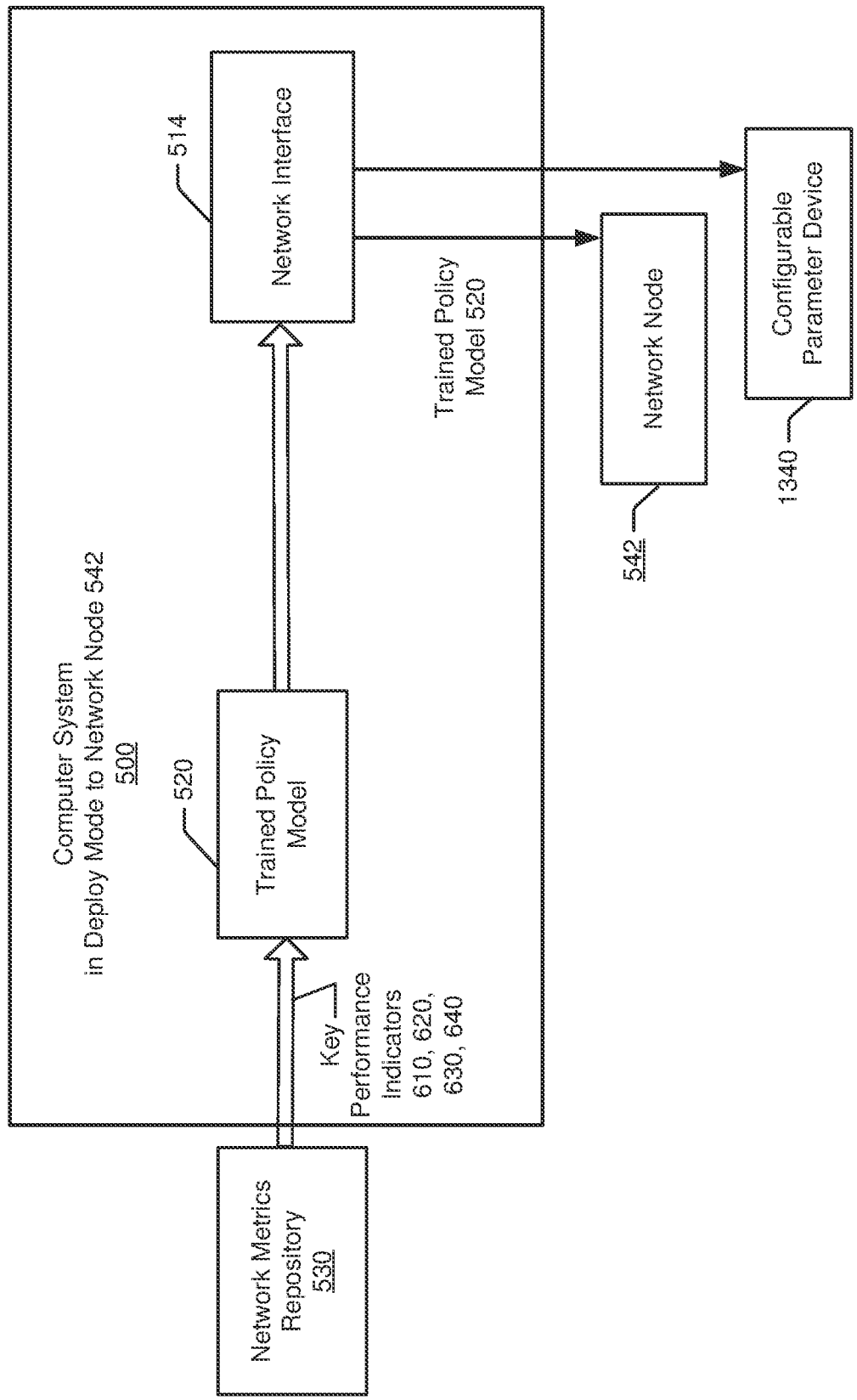
FIG. 13 is a block diagram of operational modules and related circuits and controllers of the computer system that are configured to operate during a run-time mode according to some embodiments of the present disclosure.

Referring to FIG. 13, in a deploy mode, the computer system 500 deploys the trained policy model 520 to a network node 542 in the telecommunications network. Network node 542 operates the trained policy model to output a probability of actions for controlling a configurable parameter of the telecommunications network (e.g., RET of an antenna). At network node 542, the policy model neural network circuit 520 can operate on a stream of incoming KPIs from the telecommunications network. The probability of actions value 1200 (FIG. 12) from the output node of the policy model neural network circuit 520 is provided to a configurable parameter device 1340. The configurable parameter device 1340 can generate action commands which are communicated to a selected one of the communication network nodes 542 or, e.g., a RET antenna 110 to implement the RET antenna tilt angle of the probability of actions having highest probability.

Some embodiments provide methods and a computer system for running a policy model whose input is observation in the network and output is an action on network configuration change (e.g., tilt adjustment).

Some embodiments provide methods and a computer system for a training pipeline that makes the policy model learn offline from the historical log of network configuration changes made by the deployed solution (e.g., a deployed SON RET optimization solution).

Some embodiments provide methods and a computer system for a training pipeline that uses an IPS estimator to remove severe bias in training that comes from incompleteness and unbalanced action samples in the dataset.

As used herein, network node refers to equipment capable, configured, arranged and/or operable to communicate directly or indirectly with a user device and/or with other network nodes or equipment in the radio communication network to enable and/or provide wireless access to the user device and/or to perform other functions (e.g., administration) in the radio communication network. Examples of network nodes include, but are not limited to, access points (APs) (e.g., radio access points), base stations (BSs) (e.g., radio base stations, Node Bs, evolved Node Bs (eNBs), gNode Bs (including, e.g., network node 542, etc.). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio.

Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node. More generally, however, network nodes may represent any suitable device (or group of devices) capable, configured, arranged, and/or operable to enable and/or provide a user device with access to the telecommunications network or to provide some service to a user device that has accessed the telecommunications network.

Figure 14:
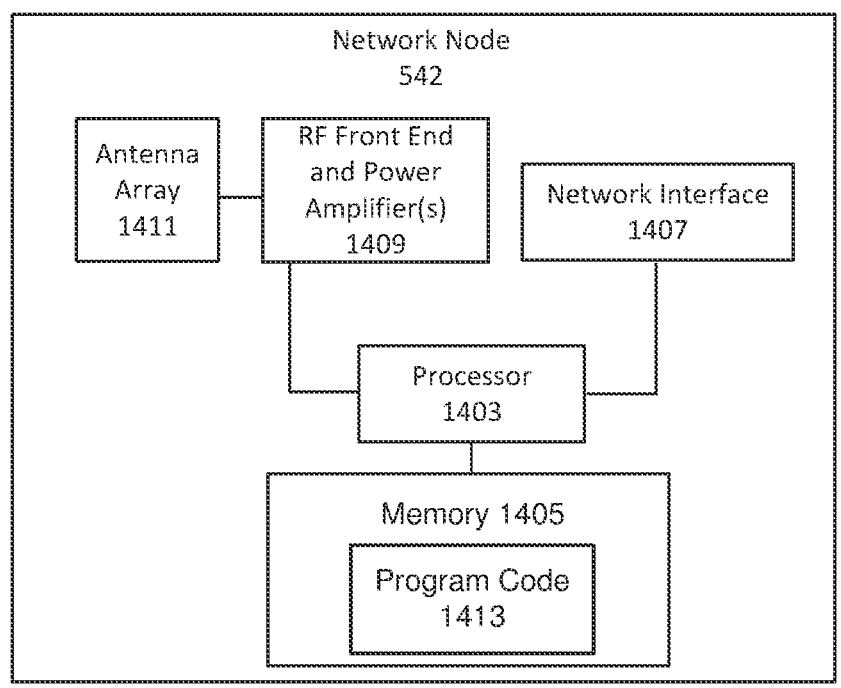
FIG. 14 is a block diagram illustrating a network node according to some embodiments of the present disclosure.

FIG. 14 is a block diagram illustrating a network node according to some embodiments of inventive concepts. Network node 542 may be implemented using structure of FIG. 14 with instructions stored in device readable medium (also referred to as memory) 1405 of network node 542 so that when instructions of memory 1405 of network node 542 are executed by at least one processor (also referred to as processing circuitry) 1403 of network node 542, at least one processor 1403 of network node 542 performs respective operations discussed herein. Processing circuitry 1403 of network node 542 may thus transmit and/or receive communications to/from one or more other network nodes/entities/servers of a telecommunications network through network interface 1407 of network node 542. In addition, processing circuitry 1403 of network node 542 may transmit and/or receive communications to/from one or more wireless devices through interface 1401 of network node 542 (e.g., using transceiver 1401).

These and other related operations will now be described in the context of the operational flowcharts of FIGS. 15-17 of operations that may be performed by a computer system (e.g., computer system 500) according to various embodiments of inventive concepts. Each of the operations described in FIGS. 15-17 can be combined and/or omitted in any combination with each other, and it is contemplated that all such combinations fall within the spirit and scope of this disclosure.

Figure 15:
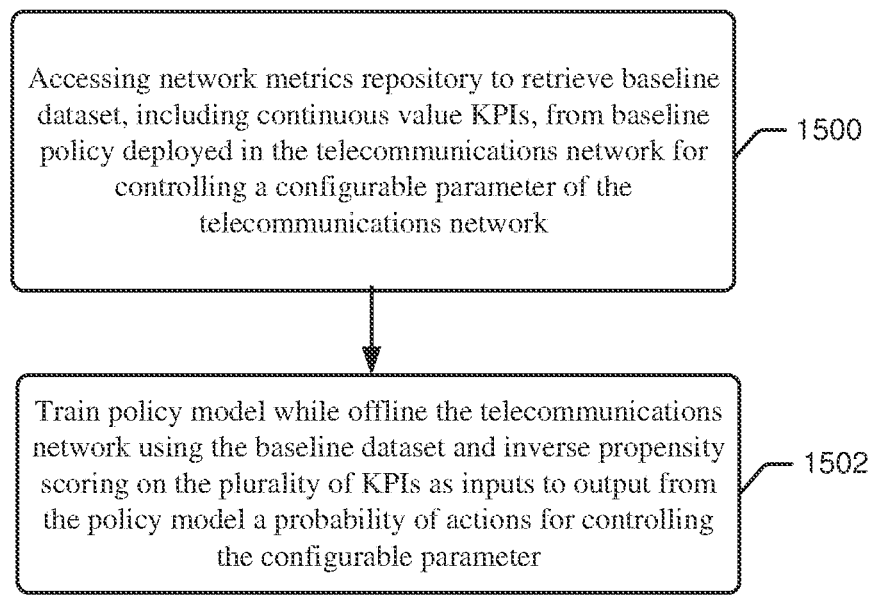
FIGS. 15-17 are flowcharts illustrating operations that may be performed by a computer system in accordance with some embodiments of the present disclosure.

Referring initially to FIG. 15, operations can be performed by a computer system (e.g., 500 implemented using the structure of the block diagram of FIG. 5) for a telecommunications network 540. The operations of computer system 540 include accessing (1500) a network metrics repository (e.g., 530) to retrieve a baseline dataset from a baseline policy (e.g., 670) of a deployed solution (e.g., 650) in the telecommunications network for controlling a configurable parameter of the telecommunications network. The baseline dataset includes a plurality of KPIs (e.g., 610, 620, 630, 640) that each have a continuous value, and a plurality of historical changes made to the configurable parameter. The operations of computer system 500 further include training (1502) a policy model (e.g., 520, 690) while offline the telecommunications network using the baseline dataset and inverse propensity scoring, $p_i$, on the plurality of KPIs as inputs to output (e.g., 680) from the policy model a probability of actions for controlling the configurable parameter.

In some embodiments, the plurality of historical changes includes a plurality of deployed actions executed by the baseline policy for controlling the configurable parameter.

In some embodiments, the policy model is a neural network (e.g., FIG. 11) having a plurality of layers (e.g., 1110, 1120, 1130).

Figure 16:
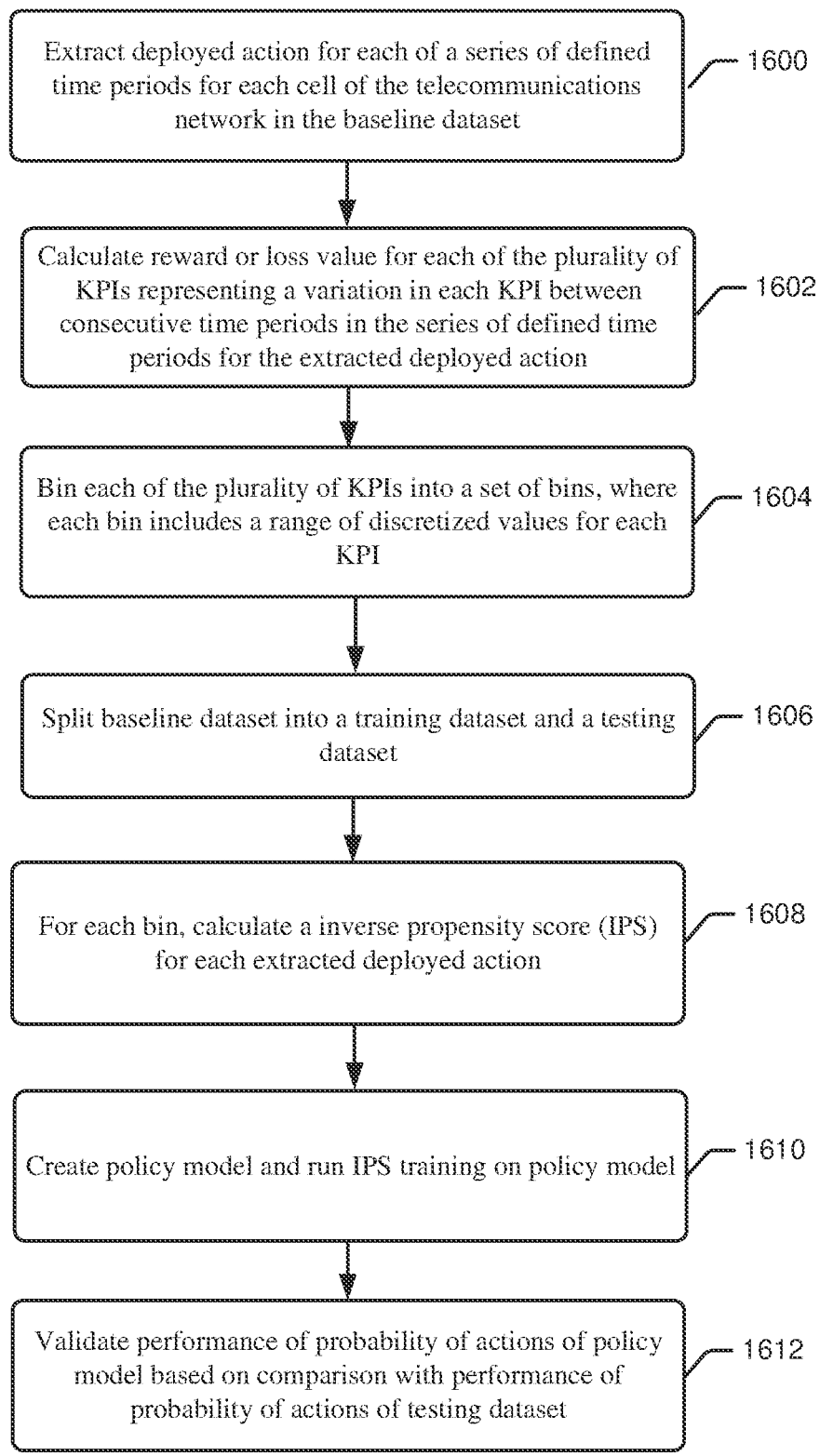

Referring to FIG. 16, further operations that can be performed by a computer system (e.g., 500 in FIG. 5) for the training the policy model while offline the telecommunications network may include extracting (1600) a deployed action from the plurality of deployed actions for each of a series of defined time periods for each cell of the telecommunications network in the baseline dataset.

In some embodiments, further operations that can be performed by a computer system (e.g., 500 in FIG. 5) for the training the policy model while offline the telecommunications network include calculating (1602) a reward or loss value for a combination of at least some of the plurality of KPIs. The reward or loss value represents a variation in the combination between consecutive time periods in the series of defined time periods for the extracted deployed action.

In some embodiments, further operations that can be performed by a computer system (e.g., 500 in FIG. 5) for the training the policy model while offline the telecommunications network include binning (1604) each of the plurality of KPIs into a set of bins. Each bin may include a range of discretized values for each KPI.

Still referring to FIG. 16, in some embodiments, further operations that can be performed by a computer system (e.g., 500 in FIG. 5) for the training the policy model while offline the telecommunications network include splitting (1606) the baseline dataset into a training dataset and a testing dataset.

In some embodiments, further operations that can be performed by a computer system (e.g., 500 in FIG. 5) for the training the policy model while offline the telecommunications network using the baseline dataset and inverse propensity scoring, $p_i$, on the plurality of KPIs as inputs include for each bin, calculating (1608) a inverse propensity score for each extracted deployed action sample as follows:

(number of extracted deployed action samples in a bin in the training dataset)/(number of samples of KPIs in the bin in the training dataset).

In some embodiments, further operations that can be performed by a computer system (e.g., 500 in FIG. 5) for the training the policy model while offline the telecommunications network using the baseline dataset and inverse propensity scoring, $p_i$, on the plurality of KPIs as inputs include creating (1610) the policy model and running inverse propensity scoring training on the policy model as follows:

$$\pi^* = \underset{\pi \in \Pi}{\operatorname{argmin}} \frac{1}{N} \sum_{i=1}^{N} \delta_i \frac{\pi(y_i|x_i)}{p_i}$$

wherein $\pi^*$ is the policy model, i is a sample index corresponding to a cell of the telecommunications network and a time period from the series of defined time periods, $\delta_i$ is the loss value, $\pi(y_i|x_i)$ is the baseline policy of the deployed solution that outputs a probability of action y; given each continuous value of each of the plurality of KPIs as inputs, $x_i$, and $p_i$ is the inverse propensity score.

In some embodiments, further operations that can be performed by a computer system (e.g., 500 in FIG. 5) include validating (1612) performance of the probability of actions of the policy model based on comparison with performance of the probability of actions of the testing dataset.

Figure 17:
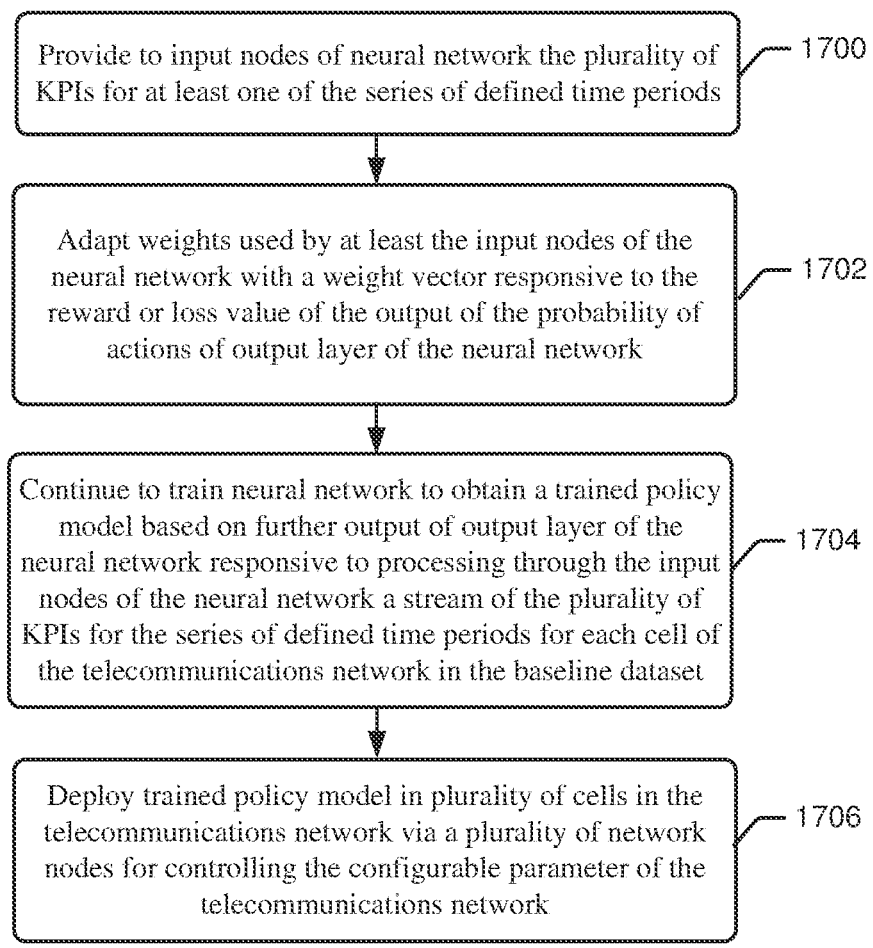

Referring to FIG. 17, further operations that can be performed by a computer system (e.g., 500 in FIG. 5) for the training the policy model while offline the telecommunications network may include providing (1700) to input nodes (e.g., 1110) of the neural network (e.g., FIG. 11) the plurality of KPIs for at least one of the series of defined time periods. Further operations may include adapting (1702) weights that are used by at least the input nodes (e.g., 1110) of the neural network with a weight vector responsive to the reward or loss value (e.g., 1220) of the output of the probability of actions (e.g., 1200) of at least one output layer (1130) of the neural network. Further operations may include continuing (1704) to train the neural network to obtain a trained policy model (e.g., 520) based on further output (e.g., 1200) of the at least one output layer (e.g., 1130) of the neural network, the at least one output layer (e.g., 1130) providing the further output responsive to processing through the input nodes (e.g., 1110) of the neural network a stream of the plurality of KPIs for the series of defined time periods for each cell of the telecommunications network in the baseline dataset.

Still referring to FIG. 17, in some embodiments, further operations that can be performed by a computer system (e.g., 500 in FIG. 5) include deploying (1706) the trained policy model (e.g., 520) to a plurality of cells in the telecommunications network via a plurality of network nodes (e.g., 542) for controlling the configurable parameter of the telecommunications network.

In some embodiments, the configurable parameter of the telecommunications network comprises an antenna tilt degree (e.g., 120).

In some embodiments, the plurality of KPIs include at least a capacity indication, a quality indication, and/or a coverage indication for a cell of the telecommunications network for each of the series of defined time period.

In some embodiments, the output (e.g., 680) of the policy model include a probability of actions for the antenna tilt degree for a next time period.

In some embodiments, the computer system (e.g., 500 in FIG. 5) is a cloud-based machine learning execution environment computer system or a cloud-based computing system communicatively coupled to the telecommunications network.

Operations of a network node (implemented using the structure of the block diagram of FIG. 14) will now be discussed with reference to the flow charts of FIGS. 18-19 according to some embodiments of inventive concepts. Each of the operations described in FIGS. 18-19 can be combined and/or omitted in any combination with each other, and it is contemplated that all such combinations fall within the spirit and scope of this disclosure.

Figure 18:
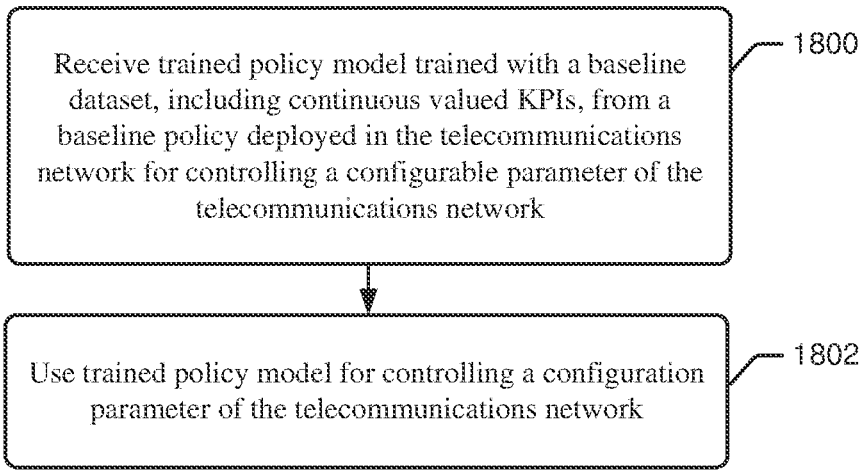
FIGS. 18-19 are flowcharts illustrating operations that may be performed by a network node in accordance with some embodiments of the present disclosure.

Referring initially to FIG. 18, operations can be performed by a network node (e.g., 542) of a telecommunications network (e.g., 540). The operations include receiving (1800) a trained policy model from a computer system (e.g., 500) communicatively connected to the network node. The trained policy model is a neural network trained with a baseline dataset from a baseline policy deployed in the telecommunications network for controlling a configurable parameter of the telecommunications network. The baseline dataset includes a plurality of KPIs that each have a continuous value and a plurality of historical changes made to the configurable parameter. The operations further include using (1802) the trained policy model for controlling a configuration parameter of the telecommunications network.

Figure 19:
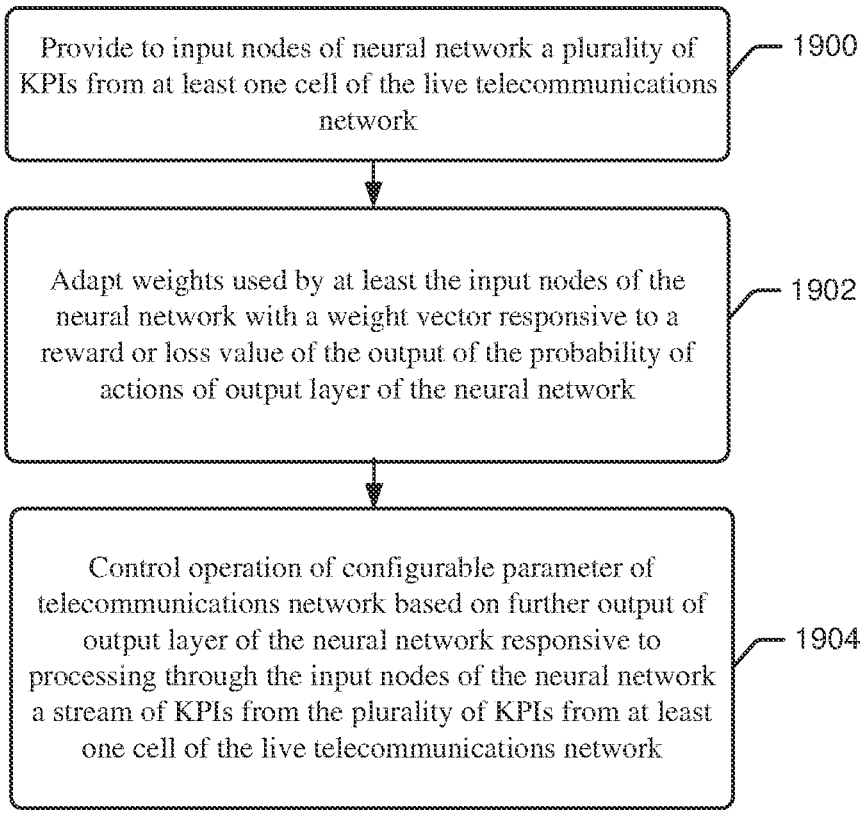

Referring to FIGS. 18 and 19, the using (1802) the trained policy model for controlling a configuration parameter of the telecommunications network includes providing (1900) to input nodes of the neural network a plurality of KPIs from at least one cell of the live telecommunications network (e.g., 540). The using (1802) further includes adapting (1902) weights that are used by at least the input nodes of the neural network with a weight vector responsive to a reward or loss value of the output of the probability of actions of at least one output layer of the neural network. The using (1802) further includes controlling (1904) operation of the configurable parameter of the telecommunications network based on further output of at least one output layer of the neural network. The at least one output layer providing the further output responsive to processing through the input nodes of the neural network a stream of KPIs from the plurality of KPIs from at least one cell of the live telecommunications network.

Still referring to FIGS. 18 and 19, in some embodiments, the configurable parameter of the telecommunications network comprises an antenna tilt degree (120).

In some embodiments, a computer system (e.g., 500) for a telecommunications network (e.g., 540) is provided. The computer system can include a network metrics repository (e.g., 530) that stores a baseline dataset from a baseline policy (e.g., 670) of a deployed solution (e.g., 690) in the telecommunications network for controlling a configurable parameter of the telecommunications network. The baseline dataset includes a plurality of key performance indicators, KPIs (e.g., 610, 620, 630, 640), that each have a continuous value and a plurality of historical changes made to the configurable parameter. The computer system can include a neural network (e.g., FIG. 11) having an input layer having input nodes (e.g., 1110), a sequence of hidden layers (e.g., 1120) each having a plurality of combining nodes, and at least one output layer (e.g., 1130) having an output node. The computer device includes at least one processor (e.g., 512). The at least one processor can be couple to the network metrics repository (e.g., 530) and to the neural network. The at least one processor configured to train a policy model (e.g., 520) offline the telecommunications network to obtain a trained policy model using the baseline dataset and inverse propensity scoring on the plurality of KPIs as inputs to output from the policy model a probability of actions for controlling the configurable parameter.

According to some embodiments, a network node (e.g., 542) of a telecommunications network (e.g., 540) is provided. The network node can include at least one processor (e.g., 1403). The network node also can include a memory (e.g., 1405). The memory can contain instructions executable by the at least one processor. The network node is operative to receive a trained policy model (e.g., 520) from a computer system (e.g., 500) communicatively connected to the network node. The trained policy model is a neural network (e.g., FIG. 11) trained with a baseline dataset from a baseline policy (e.g., 670) deployed (e.g., 690) in the telecommunications network for controlling a configurable parameter of the telecommunications network. The baseline dataset comprises a plurality of key performance indicators, KPIs (e.g., 610, 620, 630, 640), that each have a continuous value and a plurality of historical changes made to the configurable parameter. The network node is operative to use the trained policy model (e.g., 520) for controlling a configuration parameter of the telecommunications network.

In some embodiments, the use includes providing to input nodes of the neural network a plurality of KPIs from at least one cell of the live telecommunications network. The use further includes adapting weights that are used by at least the input nodes of the neural network with a weight vector responsive to a reward of loss value of the output of the probability of actions of at least one output layer of the neural network. The use further includes controlling operation of the configurable parameter of the telecommunications network based on further output of the at least one output layer of the neural network. The at least one output layer provides the further output responsive to processing through the input nodes of the neural network a stream of KPIs from the plurality of KPIs from at least one cell of the live telecommunications network.

According to some embodiments, a computer program can be provided that includes instructions which, when executed on at least one processor, cause the at least one processor to carry out methods performed by the computer system.

According to some embodiments, a computer program product can be provided that includes a non-transitory computer readable medium storing instructions that, when executed on at least one processor, cause the at least one processor to carry out methods performed by the network node.

Aspects of the present disclosure have been described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the embodiments below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Exemplary embodiments are provided below. Reference numbers/letters are provided in parenthesis by way of example/illustration without limiting example embodiments to particular elements indicated by reference numbers/letters.

LISTING OF EMBODIMENTS

Embodiment 1. A method performed by a computer system (500) for a telecommunications network (540). The method includes accessing (1500) a network metrics repository (530) to retrieve a baseline dataset from a baseline policy (670) deployed (650) in the telecommunications network for controlling a configurable parameter of the telecommunications network. The baseline dataset includes a plurality of key performance indicators, KPIs (610, 620, 630, 640) that each have a continuous value, and a plurality of historical changes made to the configurable parameter. The method further includes training (1502) a policy model (520, 690) while offline the telecommunications network using the baseline dataset and inverse propensity score, $p_i$, on the plurality of KPIs as inputs to output (680) from the policy model a probability of actions for controlling the configurable parameter.

Embodiment 2. The method of Embodiment 1, wherein the plurality of historical changes comprises a plurality of deployed actions executed by the baseline policy for controlling the configurable parameter.

Embodiment 3. The method of any of Embodiments 1 to 2, wherein the policy model comprises a neural network (1100) having a plurality of layers (1110, 1120, 1130).

Embodiment 4. The method of any of Embodiments 1 to 3, wherein the training the policy model while offline the telecommunications network includes extracting (1600) a deployed action from the plurality of deployed actions for each of a series of defined time periods for each cell of the telecommunications network in the baseline dataset. The training the policy model while offline the telecommunications network further includes calculating (1602) a reward or loss value for a combination of at least some of the plurality of KPIs, wherein the reward or loss value represents a variation in the combination between consecutive time periods in the series of defined time periods for the extracted deployed action.

Embodiment 5. The method of any of Embodiments 1 to 4, wherein training the policy model while offline further includes binning (1604) each of the plurality of KPIs into a set of bins. Each bin includes a range of discretized values for each KPI.

Embodiment 6. The method of any of Embodiments 1 to 5, wherein training the policy model while offline further includes splitting (1606) the baseline dataset into a training dataset and a testing dataset.

Embodiment 7. The method of any of Embodiments 1 to 6, wherein the training the policy model while offline the telecommunications network using the baseline dataset and inverse propensity scoring, $p_i$, on the plurality of KPIs as inputs further includes for each bin, calculating (1608) an inverse propensity score for each extracted deployed action sample as follows: (number of extracted deployed action samples in a bin in the training dataset)/(number of samples of KPIs in the bin in the training dataset).

Embodiment 8. The method of any of Embodiments 1 to 7, wherein the training (1502) the policy model while offline the telecommunications network using the baseline dataset and inverse propensity score, $p_i$, on the plurality of KPIs as inputs further comprises creating (1610) the policy model and running inverse propensity scoring training on the policy model as follows:

$$\pi^* = \underset{\pi \in \Pi}{\mathrm{argmin}} \frac{1}{N} \sum_{i=1}^{N} \delta_i \frac{\pi(y_i|x_i)}{p_i}$$

wherein $\pi^*$ is the policy model, i is a sample index corresponding to a cell of the telecommunications network and a time period from the series of defined time periods, $\delta_i$ is the loss value, $\pi(y_i|x_i)$ is the baseline policy of the deployed solution that outputs a probability of action y; given each continuous value of each of the plurality of KPIs as inputs, $x_i$, and $p_i$ is the propensity.

Embodiment 9. The method of any of Embodiments 1 to 8, further including validating (1612) performance of the probability of actions of the policy model based on comparison with performance of the probability of actions of the testing dataset.

Embodiment 10. The method of any of Embodiments 2 to 9, wherein the training (1502) the policy model while offline further includes providing (1700) to input nodes (1110) of the neural network (1100) the plurality of KPIs for at least one of the series of defined time periods. The training further includes adapting (1702) weights that are used by at least the input nodes (1110) of the neural network with a weight vector responsive to the reward or loss value (1220) of the output of the probability of actions (1200) of at least one output layer (1130) of the neural network. The training further includes continuing (1704) to train the neural network to obtain a trained policy model (520) based on further output (1200) of the at least one output layer (1130) of the neural network, the at least one output layer (1130) providing the further output responsive to processing through the input nodes (1110) of the neural network a stream of the plurality of KPIs for the series of defined time periods for each cell of the telecommunications network in the baseline dataset.

Embodiment 11. The method of any of Embodiments 1 to 10, further including deploying (1706) the trained policy model (520) to a plurality of cells in the telecommunications network via a plurality of network nodes (542) for controlling the configurable parameter of the telecommunications network.

Embodiment 12. The method of any of Embodiments 1 to 11, wherein the configurable parameter of the telecommunications network includes an antenna tilt degree (120).

Embodiment 13. The method of any of Embodiments 1 to 12, wherein the plurality of KPIs include at least a capacity indication, a quality indication, and/or a coverage indication for a cell of the telecommunications network for each of the series of defined time period.

Embodiment 14. The method of any of Embodiments 1 to 13, wherein the output (680) of the policy model includes a probability of actions for the antenna tilt degree for a next time period.

Embodiment 15. The method of any of Embodiments 1 to 14, wherein the computer system (500) includes one of a cloud-based machine learning execution environment computer system or a cloud-based computing system communicatively coupled to the telecommunications network.

Embodiment 16. A method performed by a network node (542) of a telecommunications network. The method includes receiving (1800) a trained policy model from a computer system (500) communicatively connected to the network node, wherein in the trained policy model is a neural network trained with a baseline dataset from a baseline policy deployed in the telecommunications network for controlling a configurable parameter of the telecommunications network. The baseline dataset includes a plurality of key performance indicators, KPIs, that each have a continuous value and a plurality of historical changes made to the configurable parameter. The method further includes using (1802) the trained policy model for controlling a configuration parameter of the telecommunications network. The using (1802) includes providing (1900) to input nodes of the neural network a plurality of KPIs from at least one cell of the live telecommunications network (540). The method further includes adapting (1902) weights that are used by at least the input nodes of the neural network with a weight vector responsive to a reward or loss value of the output of the probability of actions of at least one output layer of the neural network. The method further includes controlling (1904) operation of the configurable parameter of the telecommunications network based on further output of the at least one output layer of the neural network, the at least one output layer providing the further output responsive to processing through the input nodes of the neural network a stream of KPIs from the plurality of KPIs from at least one cell of the live telecommunications network.

Embodiment 17. The method of Embodiment 16, wherein the configurable parameter of the telecommunications network comprises an antenna tilt degree (120).

Embodiment 18. A computer system (500) for a telecommunications network (540) including a network metrics repository (530) that stores a baseline dataset from a baseline policy (670) deployed (650) in the telecommunications network for controlling a configurable parameter of the telecommunications network. The baseline dataset includes a plurality of key performance indicators, KPIs (610, 620, 630, 640), that each have a continuous value and a plurality of historical changes made to the configurable parameter. The computer system further includes a neural network (1100) having an input layer having input nodes (1110), a sequence of hidden layers (1120) each having a plurality of combining nodes, and at least one output layer (1130) having an output node. The computer system further includes at least one processor (512) coupled to the network metrics repository (530) and to the neural network (520, 1100). The at least one processor is configured to train a policy model (520) offline the telecommunications network to obtain a trained policy model (520) using the baseline dataset and inverse propensity scoring on the plurality of KPIs as inputs to output from the policy model a probability of actions for controlling the configurable parameter.

Embodiment 19. The computer system for a telecommunications network of Embodiment 16, wherein the train the policy model offline the telecommunications network using the baseline dataset and inverse propensity scoring on the plurality of KPIs as inputs further includes creating the policy model and running inverse propensity scoring training the policy model is as follows:

$$\pi^* = \underset{\pi \in \Pi}{\operatorname{argmin}} \frac{1}{N} \sum_{i=1}^{N} \delta_i \frac{\pi(y_i|x_i)}{p_i}$$

wherein $\pi^*$ is the policy model, i is a sample index corresponding to a cell of the telecommunications network and a time period from the series of defined time periods, $\delta_i$ is the loss value, $\pi(y_i|x_i)$ is the baseline policy of the deployed solution that outputs a probability of action y; given each continuous value of each of the plurality of KPIs as inputs, $x_i$, and $p_i$ is the propensity.

Embodiment 20. The computer system for a telecommunications network of any of Embodiments 18 to 19, wherein the at least one processor is further configured to deploy the trained policy model in a plurality of cells in the telecommunications network via a plurality of network nodes for controlling the configurable parameter of the telecommunications network.

Embodiment 21. A network node (542) of a telecommunications network (540) including at least one processor (1403); and a memory (1405). The memory containing instructions executable by the at least one processor, whereby the network node is operative to receive a trained policy model (520) from a computer system (500) communicatively connected to the network node. The trained policy model is a neural network trained with a baseline dataset from a baseline policy deployed in the telecommunications network for controlling a configurable parameter of the telecommunications network. The baseline dataset includes a plurality of key performance indicators, KPIs, that each have a continuous value and a plurality of historical changes made to the configurable parameter. The network node is further operative to use the trained policy model for controlling a configuration parameter of the telecommunications network. The use includes provide to input nodes of the neural network a plurality of KPIs from at least one cell of the live telecommunications network. The use further includes adapt weights that are used by at least the input nodes of the neural network with a weight vector responsive to a reward or loss value of the output of the probability of actions of at least one output layer of the neural network. The use further includes control operation of the configurable parameter of the telecommunications network based on further output of the at least one output layer of the neural network, the at least one output layer providing the further output responsive to processing through the input nodes of the neural network a stream of KPIs from the plurality of KPIs from at least one cell of the live telecommunications network.

Embodiment 22. A computer program product including a non-transitory computer readable storage medium (516) having computer readable program code (518) stored in the medium and when executed by at least one processor (512) of a computer system for a telecommunications network causes the computer system to perform operations including accessing a network metrics repository (530) to retrieve a baseline dataset from a baseline policy deployed in the telecommunications network for controlling a configurable parameter of the telecommunications network. The baseline dataset includes a plurality of key performance indicators, KPIs, that each have a continuous value and a plurality of historical changes made to the configurable parameter. The operations further include training a policy model (520) offline the telecommunications network using the baseline dataset and inverse propensity scoring, $p_i$, on the plurality of KPIs as inputs to output from the policy model a probability of actions for controlling the configurable parameter.

Embodiment 23. A computer program product including a non-transitory computer readable storage medium (1405) having computer readable program code (1413) stored in the medium and when executed by at least one processor (1403) of a network node (542) cause the network node to perform operations including receiving a trained policy model from a computer system (500) communicatively connected to the network node. The trained policy model is a neural network trained with a baseline dataset from a baseline policy deployed in the telecommunications network for controlling a configurable parameter of the telecommunications network. The baseline dataset includes a plurality of key performance indicators, KPIs, that each have a continuous value and a plurality of historical changes made to the configurable parameter. The operations further include using the trained policy model for controlling a configuration parameter of the telecommunications network. The using includes providing to input nodes of the neural network a plurality of KPIs from at least one cell of the live telecommunications network. The operations further include adapting weights that are used by at least the input nodes of the neural network with a weight vector responsive to a reward of loss value of the output of the probability of actions of at least one output layer of the neural network. The operations further include controlling operation of the configurable parameter of the telecommunications network based on further output of the at least one output layer of the neural network, the at least one output layer providing the further output responsive to processing through the input nodes of the neural network a stream of KPIs from the plurality of KPIs from at least one cell of the live telecommunications network.

The invention claimed is:

1. A computer implemented method performed by a computer system for a telecommunications network, the method comprising:
    accessing a network metrics repository to retrieve a baseline dataset from a baseline policy deployed in the telecommunications network for controlling a configurable parameter of the telecommunications network, wherein the baseline dataset comprises a plurality of key performance indicators (KPIs) that each have a continuous value, and a plurality of historical changes made to the configurable parameter;
    training a policy model while offline the telecommunications network using the baseline dataset and inverse propensity score, $p_i$, on the plurality of KPIs as inputs to output from the policy model a probability of actions for controlling the configurable parameter, wherein training the policy model while offline further comprises splitting the baseline dataset into a training dataset and a testing dataset and validating performance of the probability of actions of the policy model based on comparison with performance of the probability of actions of the testing dataset; and
    deploying the trained policy model to a plurality of cells in the telecommunications network via a plurality of network nodes for controlling the configurable parameter of the telecommunications network.

2. The method of claim 1, wherein the plurality of historical changes comprises a plurality of deployed actions executed by the baseline policy for controlling the configurable parameter.

3. The method of claim 2, wherein the telecommunications network comprises a number of network cells, and the training the policy model while offline the telecommunications network comprises:
    extracting a deployed action from the plurality of deployed actions for each of a series of defined time periods for each cell of the telecommunications network in the baseline dataset; and
    calculating a reward or loss value for a combination of at least some of the plurality of KPIs, wherein the reward or loss value represents a variation in the combination between consecutive time periods in the series of defined time periods for the extracted deployed action.

4. The method of claim 1, wherein the policy model comprises a neural network having a plurality of layers.

5. The method of claim 4, wherein the training the policy model while offline further comprises:
    providing to input nodes of the neural network the plurality of KPIs for at least one of a series of defined time periods;
    adapting weights that are used by at least the input nodes of the neural network with a weight vector responsive to a reward or loss value of the output of the probability of actions of at least one output layer of the neural network; and
    continuing to train the neural network to obtain a trained policy model based on further output of the at least one output layer of the neural network, the at least one output layer providing the further output responsive to processing through the input nodes of the neural network a stream of the plurality of KPIs for the series of defined time periods for each cell of the telecommunications network in the baseline dataset.

6. The method of claim 1, wherein training the policy model while offline further comprises:
    binning each of the plurality of KPIs into a set of bins, wherein each bin comprises a range of discretized values for each KPI.

7. The method of claim 1, wherein training the policy model while offline the telecommunications network using the baseline dataset and inverse propensity scoring, $p_i$, on the plurality of KPIs as inputs further comprises:
    for each bin, calculating an inverse propensity score for each extracted deployed action sample as follows:
    (number of extracted deployed action samples in a bin in the training dataset)/(number of samples of KPIs in the bin in the training dataset).

8. The method of claim 1, wherein the training the policy model while offline the telecommunications network using the baseline dataset and inverse propensity score, $p_i$, on the plurality of KPIs as inputs further comprises creating the policy model and running inverse propensity scoring training on the policy model as follows:

$$\pi^* = \operatorname*{argmin}_{\pi \in \Pi} \frac{1}{N} \sum_{i=1}^{N} \delta_i \frac{\pi(y_i|x_i)}{p_i}$$

wherein $\pi^*$ is the policy model, i is a sample index corresponding to a cell of the telecommunications network and a time period from the series of defined time periods, $\delta_t$ is the loss value, $\pi(y_i|x_i)$ is the baseline policy of the deployed solution that outputs a probability of action $y_i$ given each continuous value of each of the plurality of KPIs as inputs, $x_i$, and $p_i$ is the propensity.

9. The method of claim 1, wherein the configurable parameter of the telecommunications network comprises an antenna tilt degree.

10. The method of claim 1, wherein the plurality of KPIs comprise at least a capacity indication, a quality indication, and/or a coverage indication for a cell of the telecommunications network for each of a series of defined time period.

11. The method of claim 1, wherein the output of the policy model comprises a probability of actions for the antenna tilt degree for a next time period.

12. The method of claim 1, wherein the computer system comprises one of a cloud-based machine learning execution environment computer system or a cloud-based computing system communicatively coupled to the telecommunications network.

13. A computer implemented method performed by a network node of a telecommunications network, the method comprising:
    receiving a trained policy model from a computer system communicatively connected to the network node, wherein in the trained policy model is a neural network trained with a baseline dataset from a baseline policy deployed in the telecommunications network for controlling a configurable parameter of the telecommunications network, wherein the baseline dataset comprises a plurality of key performance indicators (KPIs) that each have a continuous value and a plurality of historical changes made to the configurable parameter, wherein training the trained policy model comprises splitting the baseline dataset into a training dataset and a testing dataset and validating performance of a probability of actions of the policy model based on comparison with performance of a probability of actions of the testing dataset;

using the trained policy model for controlling a configuration parameter of the telecommunications network.

14. The method of claim 13, wherein the using comprises:

providing to input nodes of the neural network a plurality of KPIs from at least one cell of the telecommunications network;

adapting weights that are used by at least the input nodes of the neural network with a weight vector responsive to a reward or loss value of output of the probability of actions of at least one output layer of the neural network; and controlling operation of the configurable parameter of the telecommunications network based on further output of the at least one output layer of the neural network, the at least one output layer providing the further output responsive to processing through the input nodes of the neural network a stream of KPIs from the plurality of KPIs from at least one cell of the telecommunications network.

15. The method of claim 14, wherein the configurable parameter of the telecommunications network comprises an antenna tilt degree.

16. The method of claim 13, wherein the configurable parameter of the telecommunications network comprises an antenna tilt degree.

17. A computer system for a telecommunications network comprising:

a processor configured to:

determine, from a deployed trained policy model, a value for an action from a plurality of actions for controlling an antenna tilt degree of the antenna of a network node based on a key performance indicator (KPI) input to the trained policy model, wherein in the trained policy model is a neural network trained with a baseline dataset from a baseline policy, wherein the baseline dataset comprises a plurality of KPIs that each have a continuous value and a plurality of historical changes made to a configurable parameter, wherein training the trained policy model comprises splitting the baseline dataset into a training dataset and a testing dataset and validating performance of a probability of actions of the policy model based on comparison with performance of a probability of actions of the testing dataset; and signal the value to the network node to control the antenna elevation degree of the antenna of the network node.

* * * * *